US012670501B2

(12) United States Patent
Srivastava et al.

(10) Patent No.: US 12,670,501 B2
(45) Date of Patent: Jun. 30, 2026

(54) LOGFILE RECOMMENDER SERVICE

(71) Applicant: SAP SE, Walldorf (DE)

(72) Inventors: Anviti Srivastava, Gurugram (IN); Lukas Konstandin, Wiesloch (DE); Sudhir Verma, Gurgaon (IN); Nirjar Gandhi, New Delhi (IN); Nibedita Dutta, Kharagpur (IN); Aditya Agashe, Chinchwad (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/898,229

(22) Filed: Sep. 26, 2024

(65) Prior Publication Data

US 2026/0087499 A1     Mar. 26, 2026

(51) Int. Cl.
   G06Q 30/015      (2023.01)
   G06N 20/00       (2019.01)

(52) U.S. Cl.
   CPC ........... G06Q 30/015 (2023.01); G06N 20/00 (2019.01)

(58) Field of Classification Search
   CPC ............................. G06Q 30/015; G06N 20/00
   USPC ......................................................... 705/304
   See application file for complete search history.

(56) References Cited

U.S. PATENT DOCUMENTS

2020/0184355 A1* 6/2020 Mehta ................. G06F 11/3476
2023/0014551 A1* 1/2023 Chang ................. G06F 18/2163

2023/0129123 A1* 4/2023 Wang ..................... G06Q 10/10
                                                      705/7.26
2024/0135323 A1* 4/2024 Kumar ................... G06Q 10/20
2025/0036538 A1* 1/2025 Rodenbeck ......... G06F 11/3072

FOREIGN PATENT DOCUMENTS

WO     WO-2024214113 A1 * 10/2024 ............. G06N 3/045
WO     WO-2025106085 A1 * 5/2025 ........... G06Q 30/015

OTHER PUBLICATIONS

Kubiak et al. "An Overview of Data-Driven Techniques for IT-Service-Management", IEEE Access, Oct. 15, 2018, pp. 63664-63688 (Year: 2018).*

(Continued)

*Primary Examiner* — James D Nigh
(74) *Attorney, Agent, or Firm* — Klarquist Sparkman, LLP

(57) ABSTRACT

A logfile recommender service incorporates trained machine learning models to predict recommended logfile types for support tickets. The machine learning models are trained using data from past support tickets such as titles, problem descriptions, and communication records. After receiving a request to generate a logfile recommendation for a given support ticket, the logfile recommender service first calls an attachment prediction machine learning model (e.g., a binary classification model) to predict whether logfiles are relevant to the support ticket. If so, the logfile recommender service calls an attachment recommendation machine learning model (e.g., a multi-label classification model) to generate a list of recommended logfile types for the support ticket, which is output by the logfile recommender service as the logfile recommendation. Logfiles of the recommended types can then be attached to the support ticket to facilitate and expedite resolution of the support ticket.

19 Claims, 12 Drawing Sheets

(56) References Cited

OTHER PUBLICATIONS

Huang et al. "Demystifying and Extracting Fault-indicating Information from Logs for Failure Diagnosis", arXiv:2409.13561v1, Sep. 20, 2024, 12 pages (Year: 2024).*

Catovic et al. "Linnaeus: A highly reusable and adaptable ML based log classification pipeline" 2021 IEEE/ACM 1st Workshop on AI Engineering—Software Engineering, Jul. 7, 2021, pp. 11-18 (Year: 2021).*

Stein et al. "An Analysis of Hierarchical Text Classification Using Word Embeddings", arXiv:1809.01771v1, Sep. 7, 2018, 22 pages (Year: 2018).*

Saadati et al. "Optimizing the Ticket Response Process in Customer Support Systems Using Data-Driven and Machine Learning Methods: A Case Study of IFDA", https://doi.org/10.22105/opt.v1i2.57, Sep. 2, 2014, pp. 188-204 (Year: 2014).*

Pedregosa, Fabian et al., "Scikit-learn: Machine Learning in Python", *Journal of Machine Learning Research*, 2011, vol. 12, pp. 2825-2830, 6 pages.

Chen, T. et al., "XGBoost: A Scalable Tree Boosting System", *Proceedings of the 22nd ACM SIGKDD International Conference on Knowledge Discovery and Data Mining*, 2016, pp. 785-794, 10 pages.

Lahitani, A. R. et al., "Cosine Similarity to Determine Similarity Measure: Study Case in Online Essay Assessment", *4th International Conference on Cyber and IT Service Management*, 2016, pp. 1-6, 6 pages.

* cited by examiner

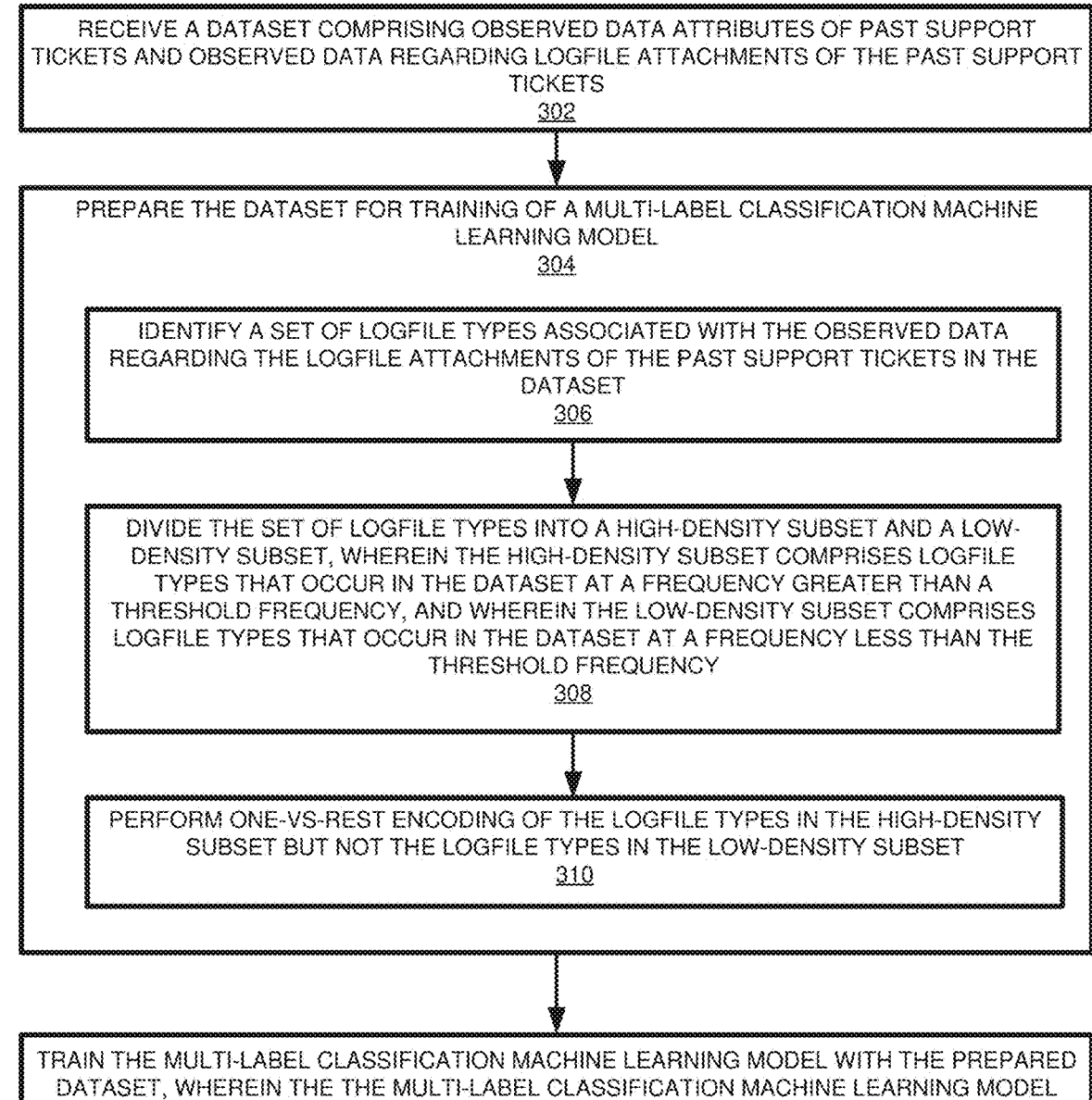

RECEIVE A DATASET COMPRISING OBSERVED DATA ATTRIBUTES OF PAST SUPPORT TICKETS AND OBSERVED DATA REGARDING LOGFILE ATTACHMENTS OF THE PAST SUPPORT TICKETS
302

PREPARE THE DATASET FOR TRAINING OF A MULTI-LABEL CLASSIFICATION MACHINE LEARNING MODEL
304

IDENTIFY A SET OF LOGFILE TYPES ASSOCIATED WITH THE OBSERVED DATA REGARDING THE LOGFILE ATTACHMENTS OF THE PAST SUPPORT TICKETS IN THE DATASET
306

DIVIDE THE SET OF LOGFILE TYPES INTO A HIGH-DENSITY SUBSET AND A LOW-DENSITY SUBSET, WHEREIN THE HIGH-DENSITY SUBSET COMPRISES LOGFILE TYPES THAT OCCUR IN THE DATASET AT A FREQUENCY GREATER THAN A THRESHOLD FREQUENCY, AND WHEREIN THE LOW-DENSITY SUBSET COMPRISES LOGFILE TYPES THAT OCCUR IN THE DATASET AT A FREQUENCY LESS THAN THE THRESHOLD FREQUENCY
308

PERFORM ONE-VS-REST ENCODING OF THE LOGFILE TYPES IN THE HIGH-DENSITY SUBSET BUT NOT THE LOGFILE TYPES IN THE LOW-DENSITY SUBSET
310

TRAIN THE MULTI-LABEL CLASSIFICATION MACHINE LEARNING MODEL WITH THE PREPARED DATASET, WHEREIN THE THE MULTI-LABEL CLASSIFICATION MACHINE LEARNING MODEL COMPRISES A CUMULATIVE HIGH-DENSITY LOGFILE MODEL AND A CUMULATIVE LOW-DENSITY LOGFILE MODEL; THE CUMULATIVE HIGH-DENSITY LOGFILE MODEL COMPRISES RESPECTIVE HIGH-DENSITY LOGFILE MODELS FOR THE LOGFILE TYPES IN THE HIGH-DENSITY SUBSET; AND THE CUMULATIVE LOW-DENSITY LOGFILE MODEL COMPRISES RESPECTIVE LOW-DENSITY LOGFILE MODELS FOR THE LOGFILE TYPES IN THE LOW-DENSITY SUBSET.
312

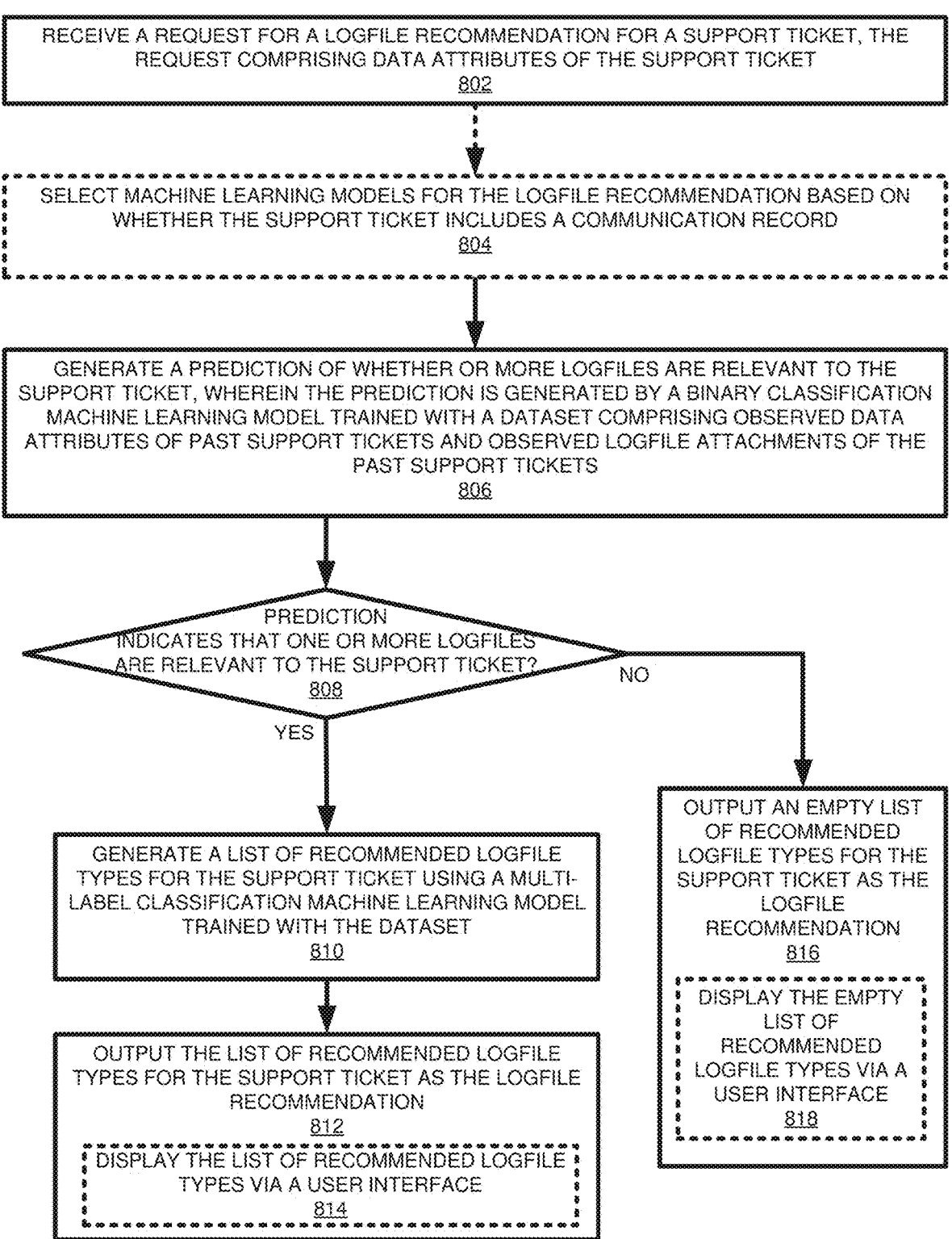

RECEIVE A REQUEST FOR A LOGFILE RECOMMENDATION FOR A SUPPORT TICKET, THE REQUEST COMPRISING DATA ATTRIBUTES OF THE SUPPORT TICKET
802

SELECT MACHINE LEARNING MODELS FOR THE LOGFILE RECOMMENDATION BASED ON WHETHER THE SUPPORT TICKET INCLUDES A COMMUNICATION RECORD
804

GENERATE A PREDICTION OF WHETHER OR MORE LOGFILES ARE RELEVANT TO THE SUPPORT TICKET, WHEREIN THE PREDICTION IS GENERATED BY A BINARY CLASSIFICATION MACHINE LEARNING MODEL TRAINED WITH A DATASET COMPRISING OBSERVED DATA ATTRIBUTES OF PAST SUPPORT TICKETS AND OBSERVED LOGFILE ATTACHMENTS OF THE PAST SUPPORT TICKETS
806

PREDICTION INDICATES THAT ONE OR MORE LOGFILES ARE RELEVANT TO THE SUPPORT TICKET?
808

YES

NO

GENERATE A LIST OF RECOMMENDED LOGFILE TYPES FOR THE SUPPORT TICKET USING A MULTI-LABEL CLASSIFICATION MACHINE LEARNING MODEL TRAINED WITH THE DATASET
810

OUTPUT THE LIST OF RECOMMENDED LOGFILE TYPES FOR THE SUPPORT TICKET AS THE LOGFILE RECOMMENDATION
812

DISPLAY THE LIST OF RECOMMENDED LOGFILE TYPES VIA A USER INTERFACE
814

OUTPUT AN EMPTY LIST OF RECOMMENDED LOGFILE TYPES FOR THE SUPPORT TICKET AS THE LOGFILE RECOMMENDATION
816

DISPLAY THE EMPTY LIST OF RECOMMENDED LOGFILE TYPES VIA A USER INTERFACE
818

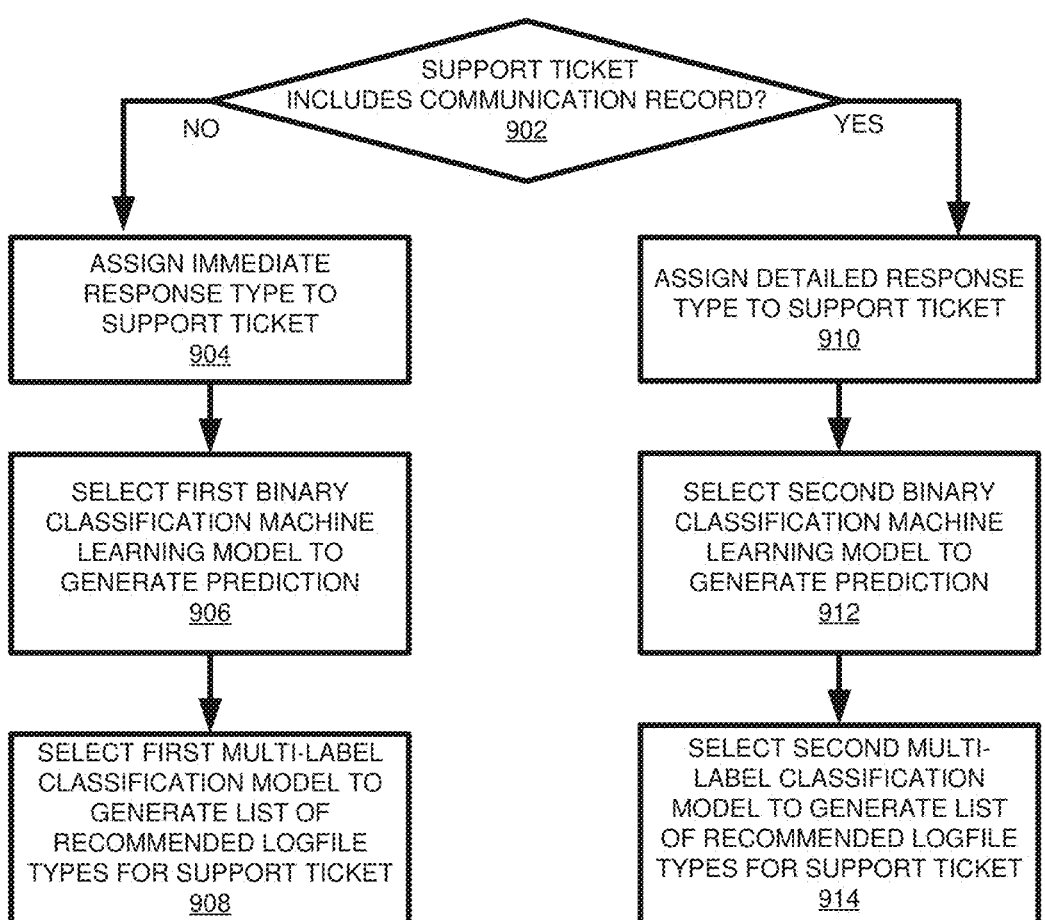
900
FIG. 9

USE THE HIGH-DENSITY LOGFILE MODELS TO GENERATE RESPECTIVE PROBABILITY SCORES FOR THE LOGFILE TYPES IN THE HIGH-DENSITY SUBSET
1002

SELECT, FROM AMONG THE LOGFILE TYPES IN THE HIGH-DENSITY SUBSET, ONE OR MORE LOGFILE TYPES WITH RESPECTIVE PROBABILITY SCORES ABOVE A PROBABILITY SCORE THRESHOLD FOR INCLUSION IN A LIST OF RECOMMENDED LOGFILE TYPES FOR THE SUPPORT TICKET
1004

USE THE LOW-DENSITY LOGFILE MODELS TO GENERATE RESPECTIVE COSINE SIMILARITY SCORES FOR THE LOGFILE TYPES IN THE LOW-DENSITY SUBSET
1006

SELECT, FROM AMONG THE LOGFILE TYPES IN THE LOW-DENSITY SUBSET, ONE OR MORE LOGFILE TYPES WITH RESPECTIVE COSINE SIMILARITY SCORES ABOVE A COSINE SIMILARITY SCORE THRESHOLD FOR INCLUSION IN THE LIST OF RECOMMENDED LOGFILE TYPES FOR THE SUPPORT TICKET
1008

1000

FIG. 10

SOFTWARE 1180 IMPLEMENTING TECHNOLOGIES

1200

LOGFILE RECOMMENDER SERVICE

FIELD

The field generally relates to identifying logfiles relevant to support tickets with assistance from trained machine learning models.

BACKGROUND

Logs are ever-present in the information technology (IT) industry. On a daily basis, a small to medium-sized IT organization can generate a significant amount of log data, often reaching gigabytes in size. These logs, also referred to as logfiles or log files, originate from various sources associated with a software application, such as the operating system, network, web traffic, application servers, and databases, among others.

Users of a software application or software service may submit support tickets to support developers when they encounter problems during use of a software application. To effectively address these problems, the support developers attempt to understand the context and source of the problem and then manually determine which log files to analyze to resolve the problem.

BRIEF DESCRIPTION OF THE DRAWINGS

FIG. 3 is a flowchart of an example method for training a multi-label classification machine learning model

FIG. 5 is a diagram showing operations for generating logfile recommendations for detailed response support tickets.

FIG. 8 is a flowchart of an example method for generating logfile recommendations.

FIG. 9 is a flowchart of an example method for selecting machine learning models for a logfile recommendation.

FIG. 10 is a flowchart of an example method for generating a list of recommended logfile types for a support ticket using a multi-label classification model.

DETAILED DESCRIPTION

Example 1)—Overview

Figure 1:
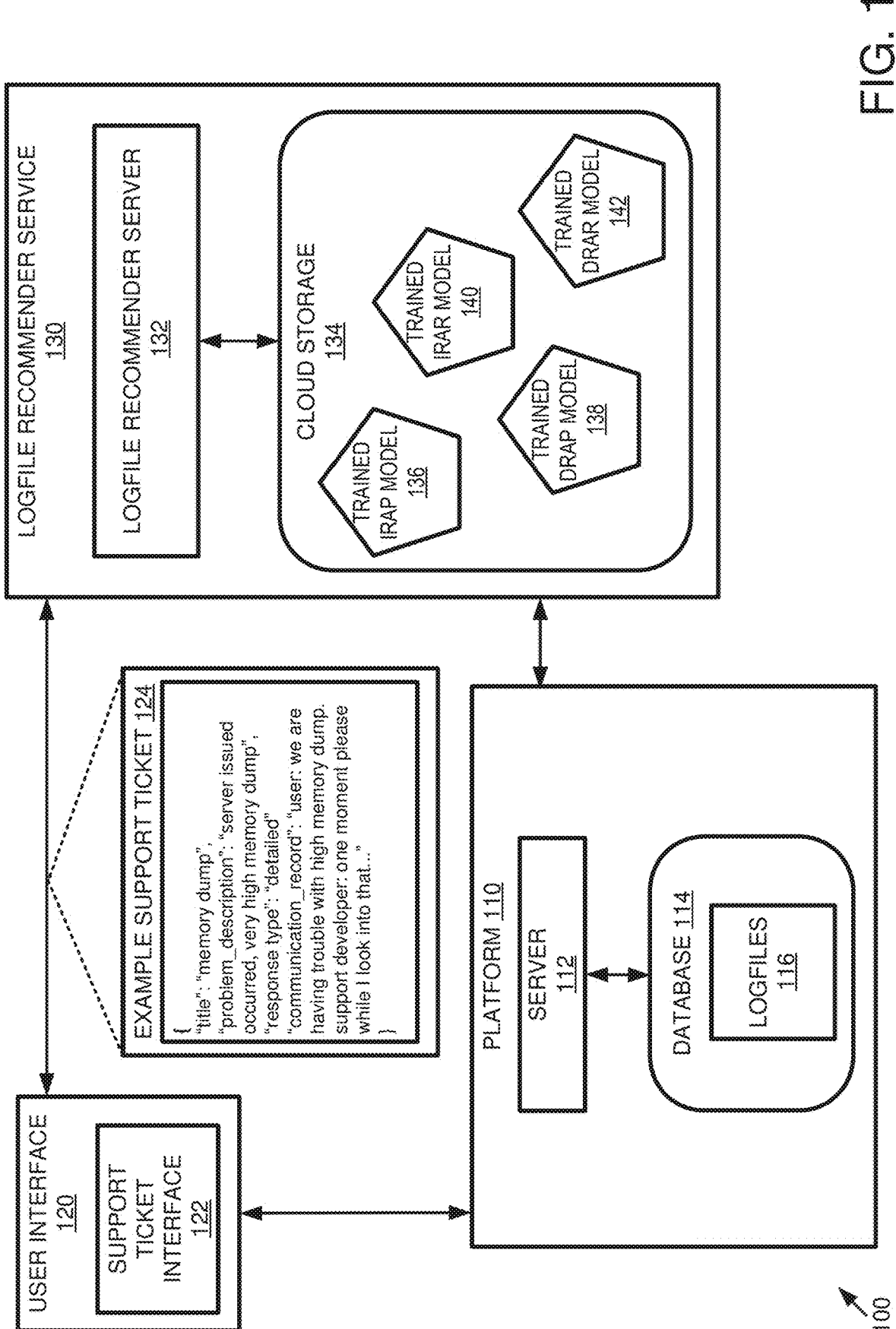
FIG. 1 is a block diagram of an example system implementing a logfile recommender service for a platform.

Online logfile analysis services may be used to analyze logfiles, e.g., by performing root cause analysis (RCA).

However, such services rely on manual determination of relevant logfiles by support developers, which may be time-consuming and inconsistent. To address at least some of these issues, techniques are described herein for training and deploying machine learning models to predict recommended logfile types for support tickets. The machine learning models can be incorporated in a logfile recommender service that leverages information from support tickets such as the title, problem description, and optionally, a record of pertinent communications between the user and support developer(s). The logfile recommender service first calls an attachment prediction machine learning model to predict whether logfiles are relevant to a given support ticket (e.g., whether analysis of any logfiles would be helpful in order to resolve the problem which is the subject of the support ticket). If so, the logfile recommender service calls an attachment recommendation machine learning model to predict recommended logfile types for the support ticket. The resulting list of recommended logfile types for the support ticket is output by the logfile recommender service. Logfiles of the recommended types can then be attached to or otherwise associated with the support ticket, either by the platform or by another entity, to facilitate and expedite resolution of the support ticket.

The logfile recommender service is built by training machine learning models on data from past support tickets. In some examples, the logfile recommender service includes an immediate response attachment prediction (IRAP) model, a detailed response attachment prediction (DRAP) model, and immediate response attachment recommendation (IRAR) model, and a detailed response attachment recommendation (DRAR) model. In the examples described herein, the IRAP and DRAP models are binary classification machine learning models, whereas the IRAR and DRAR models are multi-label classification machine learning models. In other examples, however, other types of machine learning models may be used.

In use, the logfile recommender service is invoked when a support ticket is created (e.g., by a user of a software application via input to a user interface). The support ticket can include data pertaining to a problem the user is experiencing such as a title and a problem description. Optionally, the support ticket can also include a communication record including communications between the user who created the support ticket and a support developer or other personnel associated with administration of the software application.

The data from the support ticket is received as an input to a logfile recommender server of the logfile recommender service. After receiving the data from the support ticket, the server determines whether an immediate response or a detailed response to the support ticket is appropriate. In the examples described herein, if the data does not include a communication record, the server determines that an immediate response to the support ticket is appropriate. In contrast, if the data does include a communication record, the server determines that a detailed response to the support ticket is appropriate. In other examples, however, the server may determine which response type is appropriate for a given support ticket based on additional or alternative factors.

Depending on whether an immediate response or a detailed response to the support ticket is determined to be appropriate, the logfile recommender server calls either the IRAP model or the DRAP model. When the IRAP model is called, it is provided with input data from the support ticket such as the title and problem description. When the DRAP model is called, it is provided with input data from the support ticket such as the title and problem description as well as a communication record regarding the support ticket (e.g., a record of communications between the user who submitted the support ticket and one or more support developers). In either case, the selected model predicts whether any logfile types are required for the support ticket (e.g., relevant for analysis of the problem described in the support ticket). If the selected model predicts that no logfile types are required for the support ticket, the logfile recommender server returns a corresponding output (e.g., in the form of a response displayed via a user interface).

Otherwise, if the selected model predicts that one or more logfile types are relevant to the support ticket, and depending on whether an immediate response or a detailed response to the support ticket is indicated, the logfile recommender server calls either the IRAR model or the DRAR model. When the IRAR model is called, it is provided with input data from the support ticket such as the title and problem description. Similarly, when the DRAR model is called, it is provided with input data from the support ticket such as the title and problem as well as the record of communications. In either case, the model receives the input data, predicts one or more logfile types which are likely relevant to the support ticket based on the input data, and returns a corresponding output (e.g., in the form of a list of recommended logfile type(s) displayed via a user interface).

The described technologies thus offer considerable improvements over conventional techniques in which logfiles or logfile types relevant to a support ticket are identified manually. For example, the techniques described herein can reduce the need for support developers or users to manually identify logfile types or individual logfiles which are relevant to a given support ticket, thus allowing them to focus on more complex tasks such as analyzing pertinent logfiles.

While examples specific to support tickets are discussed herein, the disclosed techniques can also be applied in the context of other types of software systems, applications, or services.

Example 2)—Example System Implementing a Logfile Recommender Service

FIG. 1 is a block diagram of an example system 100 implementing a logfile recommender service. In the example, the system 100 includes a platform 110, a user interface 120, and a logfile recommender service 130. In accordance with the techniques described herein, the logfile recommender service 130 can utilize trained machine learning models to predict logfile types which are relevant to a support ticket.

Platform 110 can be an on-premises or cloud-based platform comprising one or more software applications (e.g., software applications installed locally on client computing devices, cloud-based software applications, or other types of software applications). In the depicted example, platform 110 includes a server 112 and a database 114. Database 114 stores logfiles 116, among other data. In practice, platform 110 may also include other components which are not depicted in FIG. 1 for the sake of simplicity.

Logfiles 116 can include digital records that capture and store data related to events occurring within the platform 110. In particular, the logfiles 116 can include chronological entries of events, operations, and system states so as to serve as a historical record for analyzing system performance and diagnosing issues. Each of the logfiles 116 may be associated with one of a plurality of logfile types, such that the logfiles 116 are categorized by type.

User interface 120 is configured to display information to and receive input from a user of the platform 110. In the example, the user interface 120 includes a support ticket interface 122 which is configured to generate a support ticket based on user input. As used herein, the term support ticket refers to a digital record or entry within a customer support system that includes details of a user inquiry, issue, or request for assistance. A support ticket may be used to facilitate the resolution of user issues in the context of a software application or platform (e.g., platform 110) by allowing support personnel to document actions taken, update the status of the issue, and communicate with the customer regarding the progress or outcome of their request.

The support ticket interface 122 can include a plurality of text boxes which are configured to receive text input by a user of the platform 110, such as a title text box, a description text box, and a communication record text box. Alternatively or additionally, the user interface 120 may be configured to receive speech input from a user, and a speech-to-text model may be run to transform the spoken language into digitalized text which is used to populate the text boxes of the support ticket interface 122.

The support ticket interface 122 may be configured to receive user input to the communication record text box as part of a text dialog between the user and a support developer of the platform or other administrative or support personnel associated with the platform. The text dialog may be initiated by the user, or by the support developer or other personnel. The communication record text box can display a response from the support developer or other personnel to the user input, and display subsequent user input and response(s) from the support developer or other personnel to the subsequent user input. The user input and response(s) from the support developer or other personnel collectively form a communication record. As described further herein, the logfile recommender service 130 can determine whether to provide an immediate response or a detailed response to the support ticket based on whether the support ticket includes a communication record (e.g., based on whether the communication record text box is populated).

An example support ticket 124 is shown, which may be generated via input to the support ticket interface 122. The example support ticket 124 contains structured text in the form of field-value pairs for a title field, a problem description field, and a communication record field; in other examples, a support ticket may include more or fewer fields than those of example support ticket 124.

As described further herein, the logfile recommender service 130 is configured to receive a support ticket from the user interface 120 and generate an appropriate response. The response generated by the logfile recommender service indicates whether logfiles are required for (e.g., likely to be relevant to) the support ticket and, if so, provides a list of recommended logfile types for the support ticket 124. Towards this end, the logfile recommender service 130 includes a logfile recommender server 132 and cloud storage 134 storing a plurality of trained machine learning models. In the example, the trained machine learning models stored in the cloud storage 134 include a trained IRAP model 136, a trained DRAP model 138, a trained IRAR model 140, and a trained DRAR model 142. The trained machine learning models can be run within the logfile recommender service 130 (e.g., run on the logfile recommender server 132), within the platform 110 (e.g., run on the server 112), or be consumed via cloud services from an external provider. In some examples, one or more of the trained IRAP model 136, the trained DRAP model 138, the trained IRAR model 140, and the trained DRAR model 142 may perform Natural Language Processing (NLP), among other functionalities.

The trained IRAP model 136 and the trained DRAP model 138, which are described as attachment prediction models, are configured to predict whether one or more logfiles are required for (e.g., relevant to) the support ticket 124. The trained IRAP model 136 is called by the logfile recommender server 132 when the support ticket does not include a communication record, whereas the trained DRAP model 138 is called by the logfile recommender server 132 when the support ticket does include a communication record. In either case, the selected model predicts whether any logfiles are required for the support ticket. If the selected model predicts that no logfiles are required for the support ticket, the logfile recommender server returns a corresponding output (e.g., in the form of a response displayed via the user interface 120). As described further herein, the trained IRAP model 136 and the trained DRAP model 138 may perform binary classification, and thus may alternatively be referred to as binary classification machine learning models.

Otherwise, if the selected model predicts that one or more logfiles are required for the support ticket, and depending on the response type of the support ticket (immediate vs. detailed), the logfile recommender server 132 calls either the trained IRAR model 140 or the trained DRAR model 142. When the trained IRAR model 140 is called, it is provided with input data from the support ticket such as the title and problem description. Similarly, when the trained DRAR model 142 is called, it is provided with input data from the support ticket such as the values of the title, problem description, and communication record fields. In either case, the model predicts one or more logfile types which are likely relevant to the support ticket and returns a corresponding output (e.g., in the form of a list of recommended logfile types displayed via the user interface 120). As described further herein, the trained IRAR model 140 and the trained DRAR model 142 may perform multi-label classification, and thus may alternatively be referred to as multi-label classification machine learning models.

In the example, the logfile recommender service 130 includes multiple trained machine learning models. In other examples, the logfile recommender service 130 may include a single machine learning model, or other types of machine learning models. For example, a single multi-functional machine learning model may be employed, or different types of machine learning models may be employed than those described herein.

Any of the systems herein, including the system 100, can comprise at least one hardware processor and at least one memory coupled to the at least one hardware processor. The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, the platform 110 and/or the logfile recommender service 130 can include additional components.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, data such as the logfiles 116, example support ticket 124, and the like can be stored in one or more computer-readable storage media or computer-readable storage devices. The technologies described herein can be generic to the specifics of operating systems or hardware and can be applied in any variety of environments to take advantage of the described features.

Figure 2:
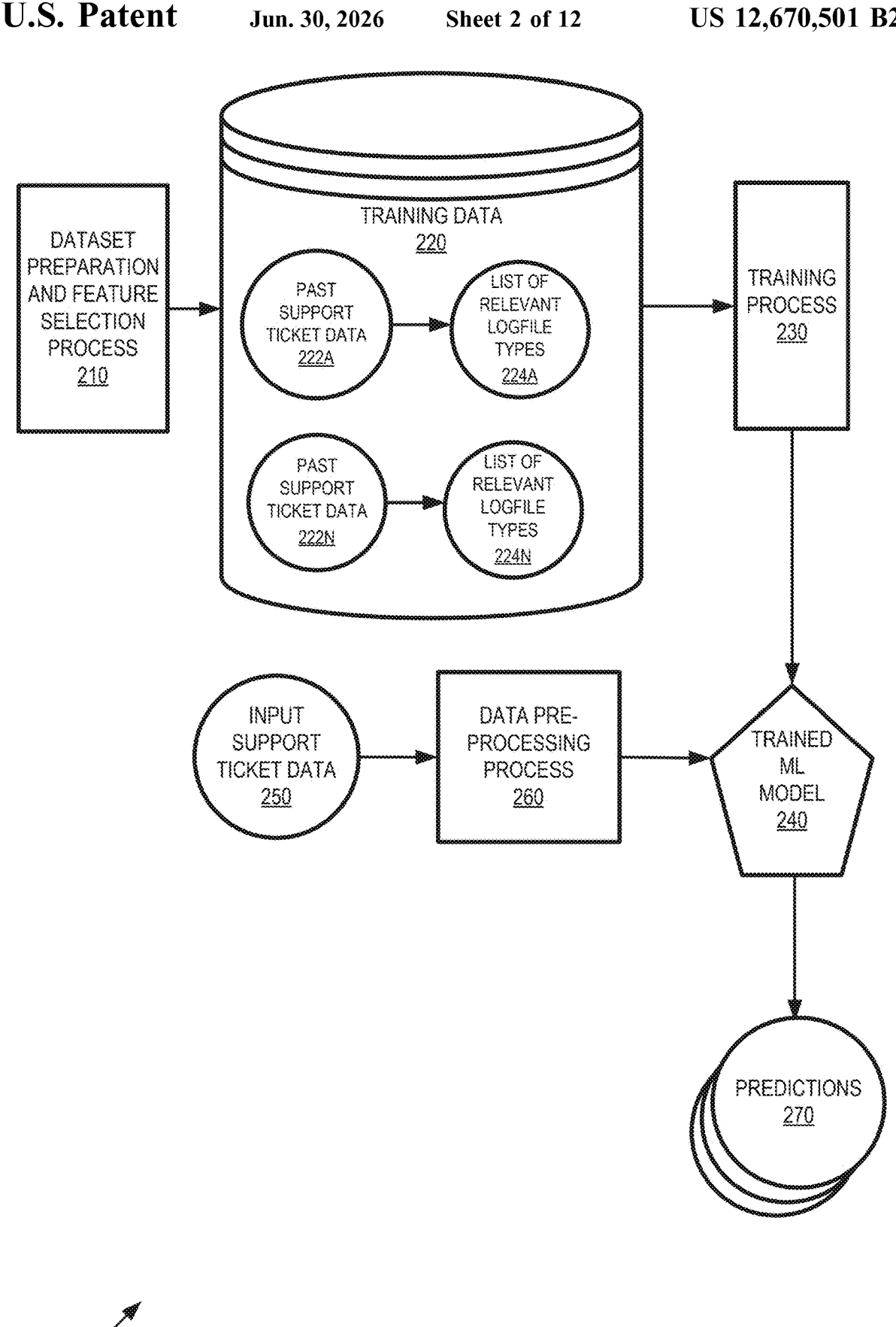
FIG. 2 is a block diagram of a detailed view of an example system implementing machine learning to generate logfile attachment predictions and recommendations for support tickets.

Example 3—Example System for Training and Implementing a Machine Learning Model of a Logfile Recommender Service FIG. 2 is a block diagram of an example system 200 for training and implementing a machine learning model to generate predictions for a logfile recommender service (e.g., logfile recommender service 130 of FIG. 1). The system 200 can be used to train and implement machine learning models such as binary classification machine learning models for predicting whether logfiles are relevant to a support ticket (e.g., the trained IRAP model 136 and the trained DRAP model 138 of FIG. 1) and multi-label classification machine learning models for predicting recommended logfile types for a support ticket (e.g., the trained IRAR model 140 and the trained DRAR model 142 of FIG. 1). In particular, the machine learning models are trained using past support ticket data, and then deployed to generate logfile predictions for a given support ticket based on input data from the support ticket.

While the training and implementation process is generally similar for the different machine learning models of the logfile recommender service, certain aspects are different among the models as described below. For example, the training data for the immediate response models and the detailed response models may include values of parameters such as the title and problem description of past support tickets along with a list of logfile types that were determined to be relevant to the past support tickets. However, the training data for the detailed response models may additionally include communication records for past support tickets. Similarly, for a given support ticket, the input data for the immediate response models and the detailed response models may include values of parameters such as the title and problem description of the given support ticket along with a list of logfile types that were determined to be relevant to the past support tickets. However, the input data for the detailed response model may also additionally include a communication record for the given support ticket. In instances where no logfile types were determined to be required for a given past support ticket, the data for the given past support ticket may include an empty list of recommended logfile types.

Further, the predictions generated by the trained machine learning models differ among the models. For example, the predictions generated by the logfile attachment prediction machine learning models (e.g., the trained IRAP model 136 and the trained DRAP model 138 of FIG. 1) for a given support ticket are predictions of whether any logfiles are required for the given support ticket. In contrast, the predictions generated by the logfile attachment recommendation machine learning models (e.g., the trained IRAR model 140 and the trained DRAR model 142 of FIG. 1) for a given support ticket are predictions of recommended logfile types for the given support ticket (e.g., a list of recommended logfile types for the given support ticket).

Regardless of the model type, some initial steps of NLP such as dataset preparation and feature selection may be performed prior to training. The resulting "cleaned data" can then be leveraged by the models for training. Accordingly, in the example, the system 200 includes a dataset preparation and feature selection process 210.

Dataset preparation refers to the process of collecting, cleaning, and transforming raw data into a format suitable for analysis in the process of machine learning. This step can significantly enhance the performance and accuracy of the models. In the example, the dataset is created from information fetched through past support tickets created by users (e.g., old support tickets which were resolved and are no longer active). A given past support ticket may include information input by a user regarding an issue (problem) they encountered, e.g., during user of a platform such as platform 110 of FIG. 1. The information may include a plain text description of a problem, symptoms of the problem, steps to reproduce the problem, etc. The text description may be in English or in another language. This information can be leveraged by the logfile recommender service to prepare a dataset for the training of machine learning models in later steps.

Feature selection involves discerning and retaining the most informative aspects of the data. By strategically choosing relevant features, benefits are achieved such as enhanced model accuracy, reduce computational complexity, and a more easily interpretable representation of linguistic patterns, thereby facilitating the extraction of meaningful insights from textual data. In the examples described herein, the features selected for training the immediate response models are the title and problem description set forth in the past support tickets, whereas the features selected for training the detailed response models are the title, problem description, and communication records set forth in the past support tickets. In other examples, however, different sets of features may be selected for the different types of models.

The dataset preparation may be performed prior to the feature selection, or vice versa. In either case, the dataset preparation and feature selection process 210 may also include a sanitization step in which personal information in the past support tickets is anonymized. The sanitization step may be performed to ensure the privacy and security of user data and comply with data protection regulations.

As shown, the dataset preparation and feature selection process produces training data 220. The training data 220 can include data for a plurality of past support tickets and respective lists of relevant logfile types for the past support tickets. For example, the training data 220 includes past support ticket data 222A and a list of relevant logfile types 224A (e.g., a list of logfile types which were determined to be relevant to resolution of the past support ticket). The training data 220 also includes data for additional past support tickets and respective lists of relevant logfile types, such as past support ticket data 222N and list of relevant logfile types 224N. As described herein, depending on the type of machine learning model being trained, the contents of the past support ticket data may differ. For example, the training data 220 for an IRAP model or IRAR model may include values of title and problem description fields for each of a plurality of past support tickets (along with the lists of relevant logfile types), whereas the training data 220 for a DRAP model or DRAR model may include values of title, problem description, and communication record fields for each of a plurality of past support tickets (along with the lists of relevant logfile types).

As shown, the training data 220 is used as input to a training process 230 that produces a trained machine learning model 240. As described further below, different training processes may be used for the different types of models. The trained machine learning model 240 accepts input support ticket data 250. The input support ticket data 250 may have a structured or semi-structured format such as JavaScript Object Notation (JSON), extensible Markup Language (XML), or Comma Separated Values (CSV). Alternatively, the input support ticket data may comprise unstructured data (e.g., plain text).

As shown, a data pre-processing process 260 may be performed to pre-process the input support ticket data 250 before it is provided to the trained machine learning model 240. As detailed below, the data pre-processing process 260 may include, for example, text pre-processing such as lower casing, tokenization, removal of special character and numbers, spelling correction, expanding contractions, removal of stop words or common phrases, joining common patterns of words into a single word, lemmatization, etc.

The trained machine learning model 240 is deployed (e.g., executed) to generate one or more predictions 270. The different types of machine learning models described herein produce different types of predictions 270. For example, the attachment prediction models (e.g., the trained IRAP model and the trained DRAP model) produce a prediction of whether there are logfiles that are required for the input support ticket data (and thus, the support ticket from which the input support ticket data originated). For example, the prediction may be expressed as a binary (0 or 1), where a value of 1 indicates that one or more logfile types are predicted to be relevant to the support ticket and a value of 0 indicates that no logfile types are predicted to be relevant to the support ticket. In contrast, the attachment recommendation models (e.g., the trained IRAR model and the trained DRAR model) produce a predicted list of relevant logfile types for the input support ticket data. In practice, the predictions 270 can include other information, such as respective confidence scores.

As described herein, the logfile recommender service may output recommended logfile types for support tickets based on predictions 270. For example, the logfile recommender service may be invoked to generate a recommendation of relevant logfile types for a given support ticket. The logfile recommender service may infer whether an immediate response or a detailed response to the given support ticket is appropriate based on whether the given support ticket includes a communication record. Depending on whether an immediate or a detailed response to the given support ticket is appropriate, the logfile recommender service first deploys either the trained IRAP model or the trained DRAP model to generate a prediction of whether there are logfiles that required for the given support ticket (based on input support ticket data for the given support ticket).

Responsive to a prediction that no logfile types are relevant to the given support ticket, the logfile recommender service outputs a corresponding response (e.g., in the form of text to be displayed via a user interface to inform a user that there are no logfile types recommended for the given support ticket). In contrast, responsive to a prediction that at least one logfile type is relevant to the given support ticket, the logfile recommender service proceeds to deploy either the trained IRAR model or the trained DRAR model, depending on the appropriate response type for the given support ticket (i.e., depending on whether the support ticket includes a communication record). In either case, the model generates a predicted list of relevant logfile types based on the input support ticket data for the given support ticket. The logfile recommender service then outputs a corresponding response (e.g., in the form of a list of recommended logfile types for the given support ticket to be displayed via a user interface).

Example 4—Example Training Data

In any of the examples herein, training data for the machine learning models (e.g., training data 220 of FIG. 2) can come from a variety of sources. In addition to past support ticket data, the training data can include other data such as language data (e.g., language data can include data scraped from the Internet, books, and other media sources). The training data may also include data specific to an application or platform (e.g., data specific to platform 110 of FIG. 1). It will be appreciated that the training data for the machine learning models can include significantly more training data and test data than what is shown in FIG. 2, e.g., so that predictions can be validated. There can also be additional functionality within the training process.

Example 5—Example Text Pre-Processing

The dataset preparation and data pre-processing processes described above with reference to FIG. 2 may include text pre-processing. For example, the raw data from past support tickets and the raw data from an input support ticket may include text written in diverse styles, vocabularies, and grammatical structures. Text pre-processing can be performed to standardize the text to reduce this variability, thereby ensure that the trained machine learning models can handle the text effectively.

One type of text pre-processing that may be performed is lower casing, i.e., converting all uppercase text to lowercase such that all text is lowercase. This helps to remove case-based word variations, like "Dog" and "dog," by treating them as the same word for better accuracy. Lower casing can promote consistency across diverse text sources, allowing NLP models to handle different writing styles effectively.

Another type of text pre-processing that may be performed is tokenization, in which each sentence is broken down into words and punctuation marks (e.g., using blank spaces as criteria to break down a sentence). Tokenization can help to reduce a large chunk of text into smaller units known as tokens. These tokens act as building blocks for analysis by a machine learning model which uses NLP to analyze word order, relationships between words, and even individual characters to understand the meaning and structure of the text.

Another type of text pre-processing that may be performed involves removal of special characters and numbers. For example, after tokenization, it may be helpful to remove punctuation marks, special characters, numbers, and other unwanted characters from the text. The presence of special characters and numbers in can add noise or inconsistencies in text, which in turn can make it harder for machine learning models to focus on patterns and relationships in text. In order for machine learning models to have good accuracy, text needs to be processed uniformly, regardless of formatting or stylistic variations. Accordingly, large numbers, alphanumeric identifiers, version identifiers, etc., may also be removed from text to make the text more semantically valuable. For similar reasons, HyperText Markup Language (HTML) and Uniform Resource Locators (URLs) may be removed to streamline text, thereby reducing noise and distractions.

Text pre-processing may also include spelling correction. In many NLP tasks, typographical errors and misspellings can lead to misleading results. Spelling correction can help ensure that models analyze the correct words, leading to more accurate interpretations and predictions. For example, searching for "apple" should not lead to results for "aple" if correctly spelled.

In addition, text pre-processing may include expanding contractions, which refers to the process of replacing shortened forms of words or phrases with their full versions. For example, "don't" would be expanded to "do not" and "we're" would be expanded to "we are." Similar techniques can be applied for expansion of technical words or acronyms such as those used within an organization.

Another type of text pre-processing that may be performed involves the removal of stop words or common phrases. Similar to punctuation marks, special characters, etc., there are certain commonly used words and phrases which are carry little meaning on their own but add grammatical structure and flow to speech and writing (e.g., "the," "a," "to," "thank you," "have a nice day," etc.). Removal of such words and phrases can help the machine learning model to focus on meaningful keywords that convey the actual content. A customized list of such words and phrases may be prepared for the logfile recommender service which includes words and phrases commonly used in support tickets (e.g., words and phrases which have limited semantic value in the context of support tickets).

Yet another type of text pre-processing that may be performed involves joining common patterns of words into a single word. For example, in order to reduce the feature space, certain combinations of words or patterns may be combined in a similar format (e.g., by connecting the words by an underscore or other character) so that they can be considered as a single word and feature.

The text pre-processing may also include lemmatization, which is a technique used to simplify words in text data for easier processing by machine learning models. Lemmatization uses vocabulary and context to find the correct root word (the lemma). For example, performing lemmatization on the word "caring" simplifies it to the word "care."

Example 6—Example Feature Extraction/Vectorization

In the world of NLP, machines need a way to bridge the gap between the natural language used by humans and the mathematical language they understand. Towards this end, feature extraction and vectorization can be used to transform text into numerical representations that machines can process. Scikit-learn, a Python library well-known for machine learning, offers powerful tools for text vectorization such as Term Frequency-Inverse Document Frequency (TF-IDF), Count Vectorizer, etc. The Gensim library for Python offers the Word2Vec model. In the examples described herein, the trained IRAP model, the trained IRAR model, and the trained DRAR model use the TF-IDF vectorization technique, whereas the trained DRAP model uses the Word2 Vec vectorization technique. However, other vectorization techniques or combinations of vectorization techniques may alternatively be used by the models of the logfile recommender service.

In the TF-IDF vectorization technique, important words are highlighted by assigning weights to words based on their frequency and rarity in the corpus (i.e., term frequency and inverse document frequency). In this technique, common words are downplayed: words that appear in many documents are given lower weights, while words that appear less frequently but are important in specific documents are given higher weights. In addition, in the TF-IDF technique, relevance is enhanced for information retrieval and classification tasks.

In the Word2Vec technique, computer understanding of relationships between words is improved by creating vector representations of words, essentially mapping the words onto points in a high-dimensional space. Words with similar meanings end up closer together in this space, while words with opposite meanings or unrelated concepts are further apart.

Example 7—Example Training Processes

In any of the examples herein, training of the machine learning models can proceed using a training process that trains the model using available training data. In practice, some of the data can be withheld as test data to be used during model validation.

Such a process typically involves feature selection and iterative application of the training data to a training process particular to the model. After training, the model can be validated with test data. An overall confidence score for the model can indicate how well the model is performing (e.g., whether it is generalizing well).

As described further herein, different training processes may be used for the different types of machine learning models. In some examples, the algorithm used to train both types of attachment prediction models (i.e., the IRAP model and the DRAP model) is the same, other than the dataset on which it is trained. Similarly, in some examples, the algorithm used to train both types of attachment recommendation models (i.e., the IRAR model and the DRAR model) is the same, with only difference being the dataset on which it is trained.

Example 8—Example Training Process for Attachment Prediction Models

The attachment prediction models (i.e., the IRAP model and the DRAP model) can be treated as a binary classification problem. For example, given two classes {logfile required, logfile not required}, the model should assign an anonymous text input data i to one of these classes: $i \in \{1 \rightarrow$ if logfile is required, $0 \rightarrow$ if logfile is not required$\}$. As described herein, regardless of the response type, the attachment prediction model is the first model which interacts with the input data and decides whether or not the second model (i.e., the appropriate one of the attachment recommendation models) will be called based the output predicted. Accordingly, each attachment prediction model acts as a gateway to reduce traffic for the corresponding attachment recommendation model (e.g., by diverting the cases which do not require logfiles so that the attachment recommendation model can focus on accurately predicting one or more types of logfiles which might be required).

In some examples, the attachment prediction models use the Light Gradient Boosting Machine (LightGBM) machine learning technique to perform the classification (e.g., during training as well as during deployment of the trained model). LightGBM is an open-source framework used for various tasks, from classification and ranking to regression and even multi-class classification. Testing has shown that the Light- GBM technique performs well in the context of an attachment prediction model due to its speed, accuracy, and versatility.

Example 9—Example Training Process for Attachment Recommendation Models

The attachment recommendation models (i.e., the trained IRAR model and the trained DRAR model) can be implemented as multi-label classification machine learning models. In particular, for a given text input (e.g., which includes pre-processed text which originated from a support ticket), an attachment recommendation model can determine which types of logfiles (if any) are relevant to the support ticket.

To explain the working of the model, let n represent a number of different classes (e.g., logfile types) in a dataset, where n~50+. To deal with such a large number of classes, a One-vs-Rest (OvR) encoding method may be used. OvR encoding is often used to handle multi-label classification using binary classification algorithms. The OvR encoding method can be understood as including the following three steps. In a first step, data (originally with multiple class labels) is transformed into multiple binary datasets. Each dataset focuses on one specific class as the positive class, and all other classes combined as the negative class. In a second step, a separate binary classifier is trained on each of these datasets. The classifier learns to distinguish the target class from all other classes combined. In a third step, during prediction, each binary classifier outputs a score or probability for the target class. The class with the highest score is predicted as the outcome for the data point.

It was observed after extensive research that certain logfile types with relatively few occurrences in a dataset did not give satisfactory results after training on supervised classification algorithms. To address this issue, the total number of logfile types n in a given dataset may be divided into two sub-sets (i.e., high-density logfiles and low-density logfiles) based on their frequency. The high-density subset corresponds to the subset of logfiles which occur relatively frequently in the dataset, whereas the low-density subset corresponds to the subset of logfiles which occur less frequently in the dataset. This partition can be done using a threshold value, which may vary depending on the training dataset. Accordingly, the logfile types of the high-density subset may be trained with same model configurations, whereas different model configurations may be used for the logfile types of the low-density subset.

After preparing datasets using OvR encoding for each high-density logfile, the datasets are then trained through supervised learning on a binary classifier. One example binary classifier which may be used in this context is the XGboost classifier, which is an open-source gradient boosting framework. The XGBoost classifier is known to excel in binary classification due to its powerful boosting that learns from mistakes, built-in regularization to prevent overfitting, and scalability for handling large datasets efficiently. This combination often outperforms other classifiers by effectively capturing complex data patterns while generalizing well to new data. After the individual model for each high-density logfile has been trained in this manner, the resulting trained individual models are cumulatively stored as a high-density logfile model.

The performance of the respective individual models for the high-density logfiles can be evaluated quantitatively by calculating certain metric scores such as accuracy, recall and precision, f1-score, etc. These metrics can be used for evaluating the respective individual models for the high-density logfiles separately and then leveraged to obtain a cumulative metric score for the high-density logfile model (e.g., using micro and macro measures of these metrics).

In contrast to the high-density logfile types, low-density logfile types include file types which do not have as many records in the past datasets (e.g., logfile types whose frequency in the past datasets is below a threshold). For low-density logfile types, unsupervised similarity-based algorithms may be used for training, such that all the records after vectorization are stored in the cloud storage of the logfile recommender service in vector format with the logfile attachments. These different logfile models can then be cumulatively stored as a low-density logfile model.

FIG. 3 is a flowchart of an example detailed method 300 of training a multi-label classification machine learning model to thereby implement an attachment recommendation model (e.g., the trained IRAR model and/or the trained DRAR model described herein). Method 300 can be performed, for example, in conjunction with the systems of FIGS. 1-2. Certain steps of method 300 may be performed during the dataset preparation and feature selection process 210 and/or the training process 230 of FIG. 2 in examples where trained machine learning model 240 is a multi-label classification machine learning model configured to predict recommended logfile types for a support ticket.

At 302, a dataset comprising observed data attributes of past support tickets and observed data regarding logfile attachments of the past support tickets is received.

At 304, the method includes preparing a dataset for training of a multi-label classification machine learning model. In the example, the preparation of the dataset includes identifying a set of logfile types associated with the observed data regarding the logfile attachments of the past support tickets in the dataset at 306.

The preparation of the dataset further includes, at 308, dividing the set of logfile types into a high-density subset and a low-density subset, wherein the high-density subset comprises logfile types that occur in the dataset at a frequency greater than a threshold frequency, and wherein the low-density subset comprises logfile types that occur in the dataset at a frequency less than the threshold frequency.

In addition, at 310, the preparation of the dataset includes performing One-vs-Rest encoding of the logfile types in the high-density subset, but not the logfile types in the low-density subset.

At 312, the method includes training the multi-label classification machine learning model with the prepared dataset. In the example, the multi-label classification machine learning model comprises a cumulative high-density logfile model and a cumulative low-density logfile model; the cumulative high-density logfile model comprises respective high-density logfile models for the logfile types in the high-density subset; and the cumulative low-density logfile model comprises respective low-density logfile models for the logfile types in the low-density subset. An example process for generating a prediction using the trained multi-label classification machine learning model is described below with reference to FIG. 10.

The method 300 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving a dataset can be described as sending a dataset depending on perspective.

Example 10—Example Inputs to Logfile Recommender Service

After the machine learning models of the logfile recommender service have been trained on past data and stored (e.g., in cloud storage of the logfile recommender service), the logfile recommender service can receive inputs and generate predictions for the inputs using the trained models (e.g., the trained IRAP model, the trained IRAR model, the trained DRAP model, and the trained DRAR model).

The input received by the logfile recommender service from a give support ticket varies depending on whether the appropriate response type of the support ticket is immediate or detailed. Example input fields that may be received by the logfile recommender service from a support ticket with an immediate response type are shown in Table 1 below (referred to as "Input Type 1"), whereas example input fields that may be received by the logfile recommender service from a support ticket with a detailed response type are shown in Table 2 below (referred to as "Input Type 2").

TABLE 1

| Example Input Type 1 for Immediate Response Support Ticket | | |
| --- | --- | --- |
| Field Name | Field Description | Data Format |
| Title | This field represents the title entered by a user during creation of the support ticket. | Text |
| Problem Description | This field includes an explanation of the problem input by a user in natural language (e.g., English) during creation of the support ticket. | Text |

TABLE 2

| Example Input Type 2 for Detailed Response Support Ticket | | |
| --- | --- | --- |
| Field Name | Field Description | Data Format |
| Title | This field represents the title entered by a user during creation of the support ticket. | Text |
| Problem Description | This field includes an explanation of the problem input by a user in natural language (e.g., English) during creation of the support ticket. | Text |
| Communication Record | This field includes communications regarding the problem between the user and support developer(s) that occurred before the logfile recommender service was called. | Text |

Depending on the type of input provided, the applicable models of the logfile recommender service are called by the logfile recommender server to generate a prediction. Table 3 below shows the model types called for each input type.

TABLE 3

| Example Models Called for Different Input Types | | |
| --- | --- | --- |
| Input Type | Service Call Type | Model Type |
| Input Type 1 | Immediate Response | IRAP model IRAR model |
| Input Type 2 | Detailed Response | DRAP model DRAR model |

In response to receiving an input, the logfile recommender server calls the corresponding one of the attachment prediction models (i.e., the IRAP model for Input Type 1 or the DRAP model for Input Type 2). Based on the input, the model generates a prediction of whether logfiles are required for the support ticket from which the input was derived. Depending on the prediction, the logfile recommender server determines whether to call the corresponding attachment recommendation model (i.e., the IRAR model for Input Type 1 or the DRAR model for Input Type 2). In particular, responsive to a prediction that logfiles are not required for the support ticket from which the input was derived, the logfile recommender server does not call another model and instead outputs a response (e.g., to a user interface) which indicates that logfiles are not required for the support ticket.

In contrast, responsive to a prediction that logfiles are required for the support ticket from which the input was derived, the logfile recommender server calls the corresponding one of the attachment recommendation models (i.e., the IRAR model for Input Type 1 or the DRAR model for Input Type 2). As detailed below, the attachment recommendation model generates a list of recommended logfile types for the support ticket, which is output as a logfile recommendation (e.g., to a user interface).

Example 11—Example Deployment of Attachment Recommendation Models

For a given input, deployment of the attachment recommendation model can include deployment of both the high-density logfile model and the low-density logfile model. That is, the given input may be separately input to both the high-density logfile model and the low-density logfile model. The prediction generated by the high-density logfile model and the prediction generated by the low-density logfile model may be combined to form the prediction of the attachment recommendation model (i.e., the list of recommended logfile types for the support ticket from which the input was derived).

In the example, when the trained IRAR model or the trained DRAR model is called for a given input, the high-density logfile model and the low-density logfile model are both called for the given input. When the high-density logfile model is called for the given input, separate models are called in the background for each individual high-density logfile type. As previously noted, the model for an individual high-density logfile type may be a binary classification machine learning model for that specific logfile type. During the prediction process, the models for the individual high-density logfile types each generate a probability score representing a probability that the associated logfile type is required for the given input to the attachment recommendation model. The probability scores are compared to customized threshold value, and logfile types associated with the models with probability scores greater than the threshold value are identified as recommended logfile types for the given input.

When the low-density logfile model is called for the given input, the low-density logfile model converts the given input into an input vector in the background. The low-density logfile model then finds cosine similarity scores for the input vector which represent how similar the input vector is to the vectors previously stored during the training process. In machine learning, cosine similarity is a metric used to measure the similarity between two vectors. The cosine similarity reflects the angle between the two vectors in a multi-dimensional space, ignoring their magnitude or length. For example, the following equation can be used to determine the cosine similarity between two vectors a and b:

$$\text{cosine similarity } (a, b) = \text{dot}\,(a, b)/\|a\| * \|b\|.$$

In the above equation, dot (a, b) represents the dot product of vectors a and b (i.e., the sum of the products of the corresponding elements of the vectors), and $\|a\|$ and $\|b\|$ represent the magnitudes (lengths) of vectors a and b, respectively.

After determining the respective cosine similarity scores for the input vector and the vectors stored during the training process, the attachment recommendation model selects, from among the vectors stored during the training process, the vector which has the highest cosine similarity score with the input vector and which has a cosine similarity score with the input vector greater than a specified threshold. The selected vector is then used to generate the list of recommended logfile types for the support ticket from which the given input was derived. In particular, logfile types recommended by the selected vector in the training model are identified as recommended logfile types for the given input.

In the example, the list of recommended logfile types generated by the attachment recommendation model includes the recommended logfile types identified by the high-density logfile model as well as the recommended logfile types identified by the low-density logfile model. While plural recommended logfile types are described for ease of explanation, in some examples a given model (e.g., the high-density logfile model and/or the low-density logfile model) may predict that there are no recommended logfile types, or only a single recommended logfile type.

Figure 4:
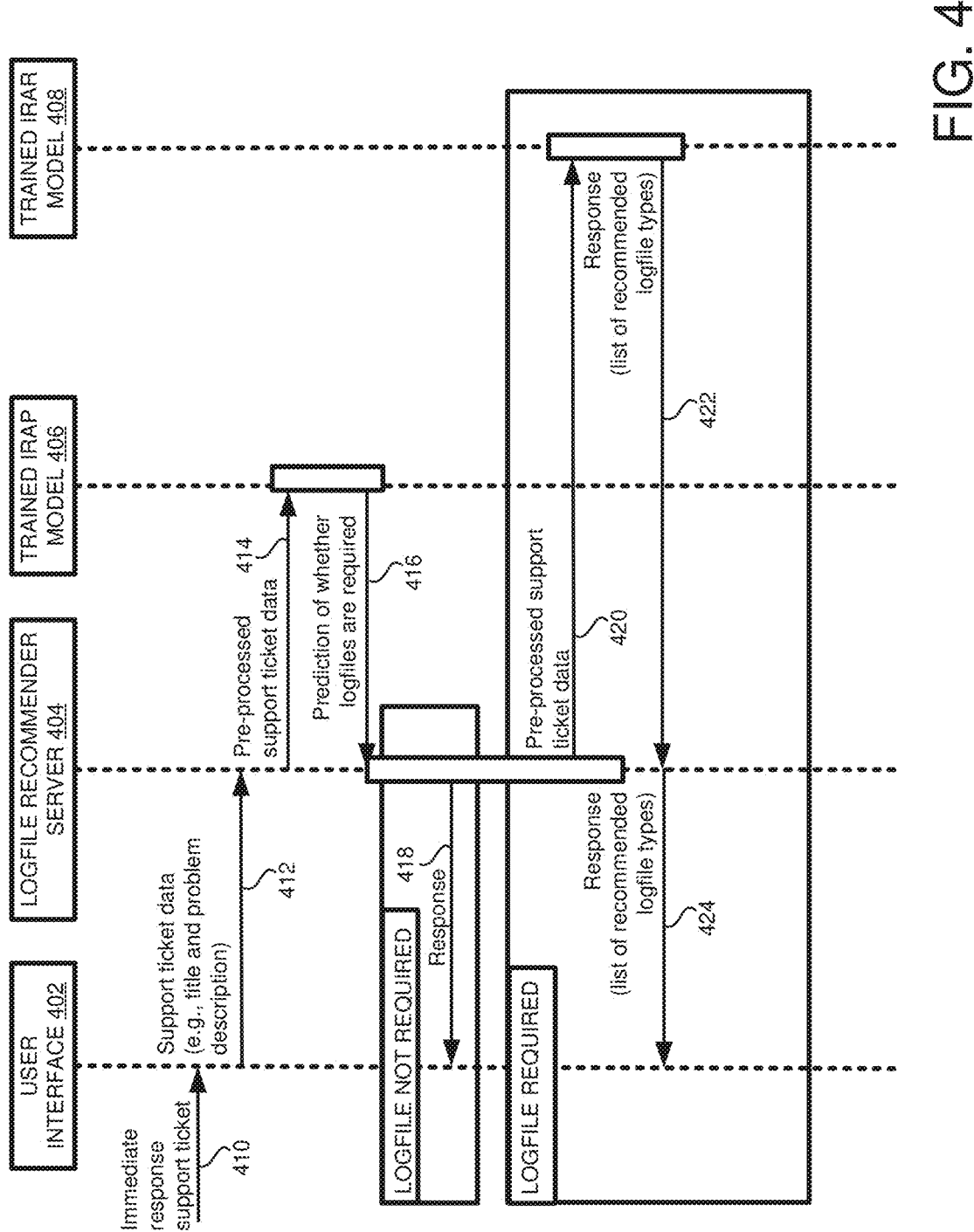
FIG. 4 is a diagram showing operations for generating logfile recommendations for immediate response support tickets.

Example 12—Example Operations for Generating Logfile Recommendations for Immediate Response Support Tickets FIG. 4 is a diagram 400 illustrating operations involved in generating logfile recommendations for immediate response support tickets (e.g., support tickets which do not include a communication record). The operations can be carried out by a user interface 402, a logfile recommender server 404, a trained IRAP model 406, and a trained IRAR model 408, which components can have functions analogous to those described for the correspondingly named components illustrated in FIG. 1.

At 410, an immediate response support ticket is input to the user interface 402 (e.g., by a user of a platform such as platform 110 of FIG. 1). For example, the user may input text to certain fields of a support ticket interface of the user interface 402, such as a title field and a problem description field, but not to a communication record field. In the example, the support ticket data implicitly indicates that an immediate response to the support ticket is desired or appropriate. The absence of text in the communication record field of the support ticket may serve as an implicit indication that an immediate response to the support ticket is desired or appropriate.

At 412, the support ticket data is sent from the user interface 402 to the logfile recommender server 404. As shown, the support ticket data may include values for title and problem description fields. After receiving the support ticket data, the logfile recommender server 404 performs pre-processing of the support ticket data (e.g., by performing one or more of the text pre-processing steps described above with reference to Example 4). After pre-processing the support ticket data, the logfile recommender server 404 sends the pre-processed support ticket data to the trained IRAP model 406 at 414 and calls the trained IRAP model 406 to generate a logfile attachment prediction for the support ticket based on the pre-processed support ticket data.

The trained IRAP model 406 then generates a prediction of whether logfiles are required for the support ticket based on the input pre-processed support ticket data, and sends the prediction to the logfile recommender server 404 at 416. As described above, the trained IRAP model 406 may perform binary classification techniques to generate the prediction (e.g., using the LightGBM framework). Depending on the prediction, the logfile recommender server 404 determines whether or not to call the trained IRAR model 408. In particular, responsive to a prediction that logfiles are not required for the support ticket, the logfile recommender server 404 sends a response to the user interface 402 at 418.

The response indicates that logfiles are not required for the support ticket. The response can be displayed via the user interface 402, e.g., as text stating that logfiles are not required for the support ticket, as an empty list of required logfiles, or in another manner.

Otherwise, if the prediction generated by the trained IRAP model 406 indicates that logfiles are required for the support ticket, the logfile recommender server 404 sends the pre-processed support ticket data to the trained IRAR model 408 at 420 and calls the trained IRAR model 408 to generate a list of recommended logfile types for the support ticket based on the pre-processed support ticket data.

The trained IRAR model 408 then generates a list of recommended logfile types for the support ticket based on the input pre-processed support ticket data. As described above, the trained IRAR model 408 may perform multi-label classification techniques to generate the list. In particular, the trained IRAR model 408 may include a high-density logfile model and a low-density logfile model which are both called to generate predictions of recommended logfiles. The list output by the trained IRAR model 408 may include the recommended logfile types predicted by the high-density logfile model and the recommended logfile types predicted by the low-density logfile model.

The trained IRAR model 408 sends a response to logfile recommender server 404 at 422 which includes the list of recommended logfile types for the support ticket. The logfile recommender server 404 forwards the list of recommended logfile types to the user interface 402 at 424 for display. In some examples, additional actions may be performed in addition to the displaying of the list (or, instead of the displaying of the list). For example, the platform or another entity may attach one or more logfiles of the recommended logfile type(s) to the support ticket after receiving the response from the trained IRAR model 408.

Figure 5:
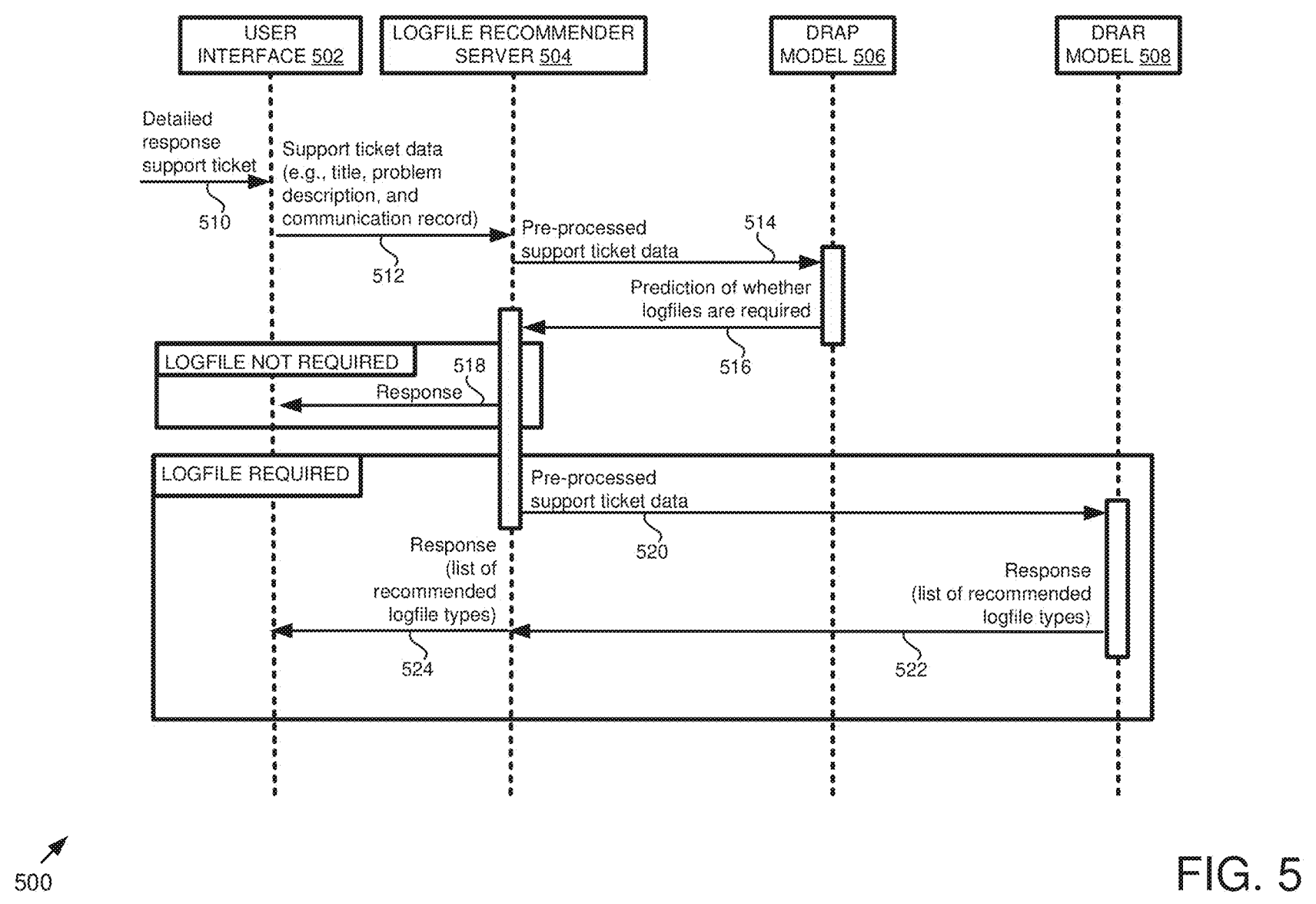

Example 13—Example Operations for Generating Logfile Recommendations for Detailed Response Support Tickets FIG. 5 is a diagram 500 illustrating operations involved in generating logfile recommendations for detailed response support tickets (e.g., support tickets which include a communication record). The operations can be carried out by a user interface 502, a logfile recommender server 504, a trained DRAP model 506, and a trained DRAR model 508, which components can have functions analogous to those described for the correspondingly named components illustrated in FIG. 1.

At 510, a detailed response support ticket is input to the user interface 502 (e.g., by a user of a platform such as platform 110 of FIG. 1). For example, the user may input text to fields of a support ticket interface of the user interface 502, such as a title field, a problem description field, and a communication record field. In addition to text input by the user, the communication record field can also include text responses to the user from a support developer or other personnel associated with the platform. In the example, the presence of text in the communication record field of the support ticket implicitly indicates that a detailed response to the support ticket is desired or appropriate.

At 512, support ticket data is sent from the user interface 502 to the logfile recommender server 504. As shown, the support ticket data may include values for title, problem description, and communication record fields. After receiving the support ticket data, the logfile recommender server 504 performs pre-processing of the support ticket data (e.g., by performing one or more of the text pre-processing steps described above with reference to Example 4). After pre-processing the support ticket data, the logfile recommender server 504 sends the pre-processed support ticket data to the trained DRAP model 506 at 514 and calls the trained DRAP model 506 to generate a logfile attachment prediction for the support ticket based on the pre-processed support ticket data.

The trained DRAP model 506 then generates a prediction of whether logfiles are required for the support ticket based on the input pre-processed support ticket data, and sends the prediction to the logfile recommender server 504 at 516. As described above, the trained DRAP model 506 may perform binary classification techniques to generate the prediction (e.g., using the LightGBM framework).

Depending on the prediction, the logfile recommender server 504 determines whether or not to call the trained DRAR model 508. In particular, responsive to a prediction that logfiles are not required for the support ticket, the logfile recommender server 504 sends a response to the user interface 502 at 518. The response indicates that logfiles are not required for the support ticket. The response can be displayed via the user interface 502, e.g., as text stating that logfiles are not required for the support ticket, as an empty list of required logfiles, or in another manner.

Otherwise, if the prediction generated by the trained DRAP model 506 indicates that logfiles are required for the support ticket, the logfile recommender server 504 sends the pre-processed support ticket data to the trained DRAR model 508 at 520 and calls the trained DRAR model 508 to generate a logfile recommendation in the form of a list of recommended logfile types for the support ticket based on the pre-processed support ticket data.

The trained DRAR model 508 then generates the list of recommended logfile types for the support ticket based on the input pre-processed support ticket data. As described above, the trained DRAR model 508 may perform multi-label classification techniques to generate the prediction. In particular, the trained DRAR model 508 may include a high-density logfile model and a low-density logfile model which are both called to generate predictions of recommended logfiles. The list of recommended logfile types output by the trained DRAR model 508 may be combination of the predictions generated by the high-density logfile model and the low-density logfile model (e.g., a list of recommended logfile types including recommended logfile types predicted by the high-density logfile model and recommended logfile types predicted by the low-density logfile model).

The trained DRAR model 508 sends a response to logfile recommender server 504 at 522 which includes the list of recommended logfile types for the support ticket. The logfile recommender server 504 forwards the list of recommended logfile types to the user interface 502 at 524 for display. In some examples, additional actions may be performed in addition to the displaying of the list (or, instead of the displaying of the list). For example, the platform or another entity may attach one or more logfiles of the recommended logfile type(s) to the support ticket after receiving the response from the trained DRAR model 508.

Example 14—Example Support Ticket Interface

Figure 6:
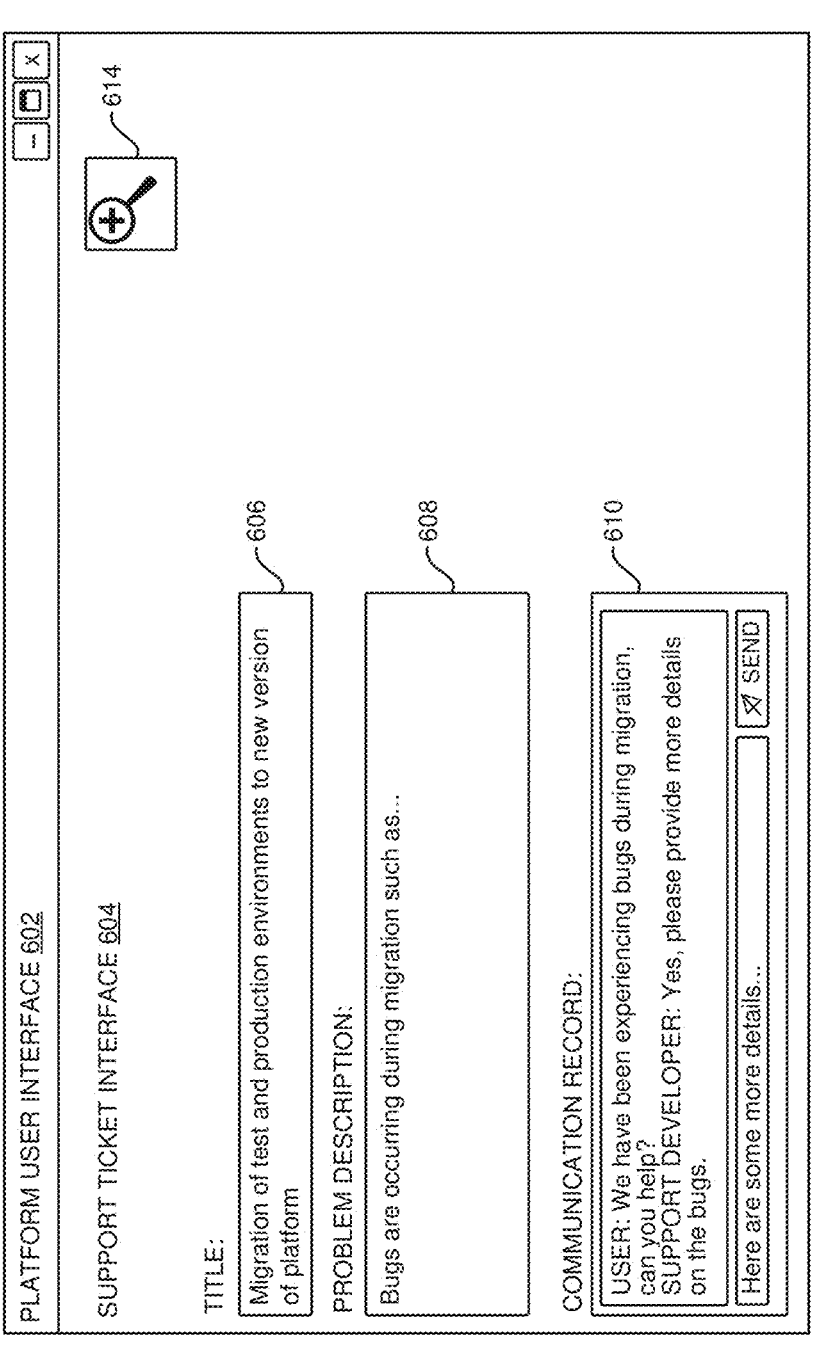
FIG. 6 is a block diagram of an example user interface for input of a support ticket.

FIG. 6 is a block diagram of an example user interface 600 which may be displayed to a user of a platform, such as platform 110 of FIG. 1. In the example, the user interface 600 includes a platform user interface 602 and a support ticket interface 604 which is displayed as part of the platform user interface 602.

The support ticket interface 604 is configured to receive user input of information regarding a problem they are experiencing in the context of the platform. A simplified view of the support ticket interface 604 is depicted for ease of explanation; in practice, the support ticket interface 604 and/or the platform user interface 602 may also include other elements (e.g., other fields, icons, etc.) in addition to, or instead of, those shown in FIG. 6. In the example, the user has input text to a title field 606 which represents the title of the problem that is the subject of the support ticket. In addition, the user has input text to a problem description field 608 which describes the problem that is the subject of the support ticket.

In addition to the title field 606 and the problem description field 608, the support ticket interface 604 includes a communication record field 610. The communication record field 610 includes a text input field in which the user can input messages in text form to initiate a text conversation with a support developer or other personnel associated with the platform, a send button for the text input field, and a conversation display field in which messages input by the user and responses from to the messages input by the user from a support developer or other personnel are displayed. In the example, a text conversation between the user and a support developer is in progress. As shown, the user is in the process of entering text in the text input field.

In the example, the support ticket interface 604 also includes a logfile recommender icon 614 which can be activated (e.g., clicked on) by the user to call the logfile recommender service for the current support ticket. For example, after populating the fields of the support ticket interface 604 with data (and optionally, after saving the data by activating a save icon or the like), the user can activate the logfile recommender icon 614 to initiate generation of a logfile prediction for the support ticket via the logfile recommender service. In examples where a communication record is included in the support ticket, such as the depicted example, the user may activate the logfile recommender icon 614 after a conversation carried out via the communication record field 610 has ended, or alternatively, while the conversation is underway. In the either case, the communication record sent to the logfile recommender service may include the text from the conversation display field. Additional features which are not shown can also be incorporated in the user interface 600. For example, the support ticket interface 604 may also include means for the user to attach logfiles to the support ticket (e.g., logfiles which they believe may be relevant to the support ticket).

Example 15—Example Logfile Recommender Service Interface

Figure 7:
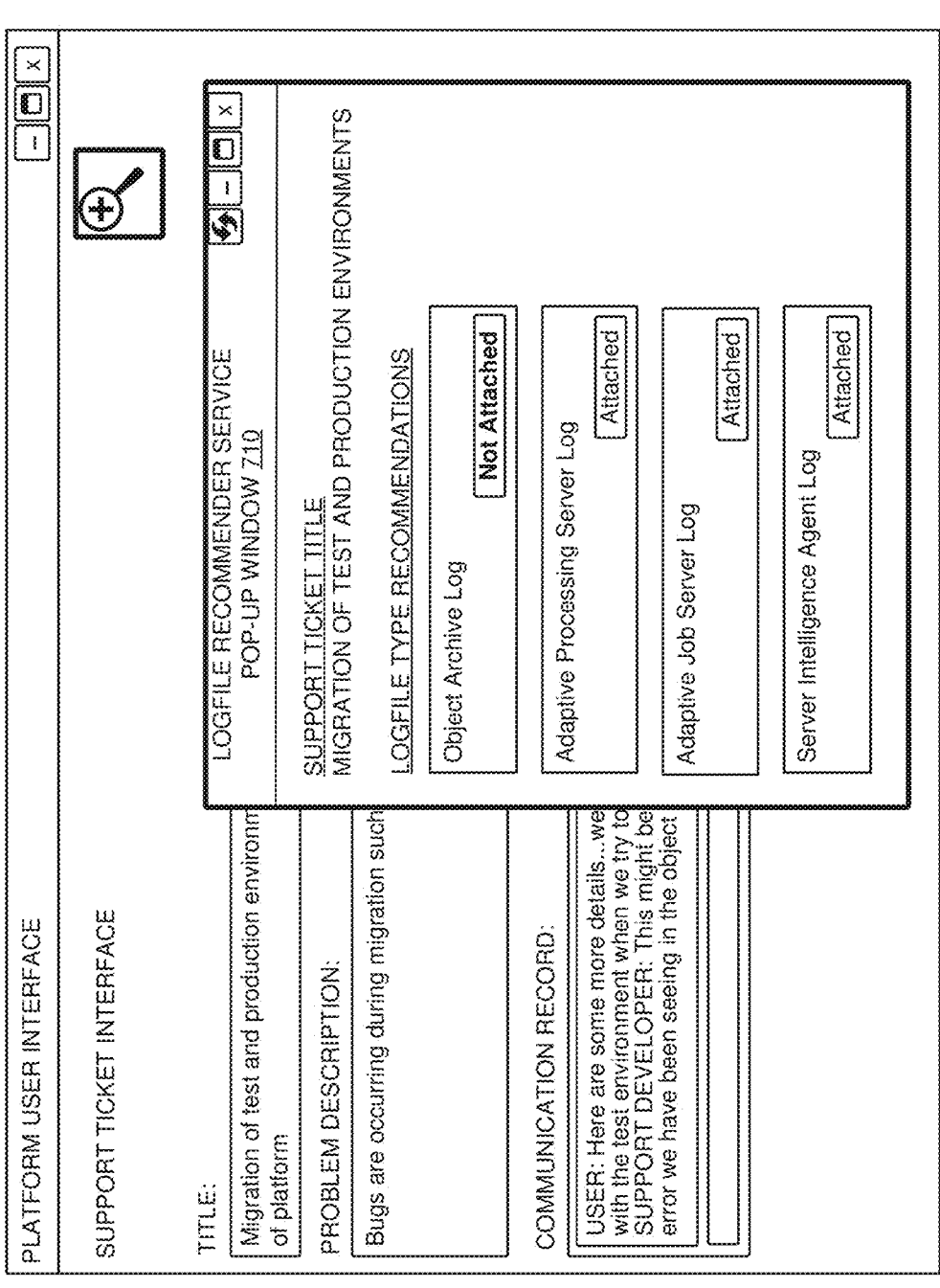
FIG. 7 is a block diagram of an example user interface displaying a list of recommended logfile types generated by a logfile recommender service.

FIG. 7 is a block diagram of an example user interface 700 displaying a logfile recommender service pop-up window 710. In particular, user interface 700 depicts an example state of user interface 600 of FIG. 6 after a user has activated the logfile recommender icon 614 (as indicated by the bold outline on the corresponding logfile recommender icon in FIG. 7). In the example, the user activated the logfile recommender icon 614 on their own initiative after some further conversation with the support developer in the communication record field 610. In other examples, during the course of the conversation, the support developer or other personnel may explicitly suggest that the user launch the logfile recommender service.

In practice, user activation of the logfile recommender icon initiates performance of a logfile recommendation process for the support ticket (i.e., the support ticket whose data is entered in the support ticket interface) by a logfile recommender service (e.g., logfile recommender service 130 of FIG. 1). After performing the logfile recommendation in the manner described herein, the logfile recommender service sends the results in the form of a response to the user interface 700, which in turn spawns the logfile recommender service pop-up window 710. In the example, the logfile recommender service pop-up window 710 displays the title of the support ticket for which the logfile recommendations have been generated, along with a logfile recommendation including a list of recommended logfile types for the support ticket. In other examples, however, different information may be displayed in the logfile recommender service pop-up window 710, and/or the information may be displayed in a different manner.

In the example, the list of recommended logfile types includes the names of the recommended logfile types along with an indication, for each recommended logfile type, of whether any logfiles of that type are already attached to the support ticket. In particular, the logfile recommender service pop-up window 710 includes an element which indicates that logfiles of the type "Object Archive Log" logfile type are not attached to the support ticket, along with respective elements for the other listed logfile types which indicate that logfiles of those types are attached to the support ticket (e.g., logfiles of those types were attached to the support ticket by the user during input of the support ticket). In other examples, however, the list of recommended logfile types may be presented in a different manner, and/or may include different information than that depicted in FIG. 7.

In other examples, the recommended logfile types determined by the logfile recommender service may be displayed in a different way than is depicted in FIG. 7 or at a different stage. For example, the list of recommended logfile types may be displayed in the same window as the support ticket interface, in another tab of the platform user interface, or at some other location rather than in a pop-up window. As another example, the recommended logfile types may be displayed via an email (e.g., an email sent by the logfile recommender service to the user who generated or input the data for the support ticket), via a chat message (e.g., a chat message sent by the logfile recommender service to the user who generated or input the data for the support ticket), or in another manner.

Additional features which are not shown can also be incorporated in the user interface 700.

Example 16—Example Method for Generating Logfile Recommendations

FIG. 8 is a flowchart of an example method 800 for generating logfile recommendations and can be performed, for example, by the system of FIGS. 1-2 and in conjunction with the other methods described herein. In particular, method 800 may be performed by a logfile recommender service such as logfile recommender service 130 of FIG. 1.

At 802, the method includes receiving a request for a logfile recommendation for a support ticket, the request comprising data attributes of the support ticket. The request may be generated by a platform based on data input to user interface by a user regarding a problem they are experienc-ing in the context of a platform (e.g., a software bug). The data attributes of the support ticket may be received in a semi-structured format (e.g., as a JSON file), or in another format.

Optionally, at 804, the method includes selecting machine learning models for the logfile recommendation based on whether the data attributes of the support ticket include a communication record. As described herein, different versions of the attachment prediction model and attachment recommendation model may be used for a given support ticket depending on whether an immediate or detailed response to the support ticket is appropriate, which may be determined based on whether the support ticket includes a communication record. An example process for selecting machine learning models for the logfile recommendation is described herein with reference to FIG. 9.

At 806, the method includes generating a prediction that one or more logfiles are relevant to the support ticket, wherein the prediction is generated by a binary classification machine learning model trained with a dataset comprising observed data attributes of past support tickets and observed data regarding logfile attachments of the past support tickets.

At 808, the method includes determining whether the prediction indicates that one or more logfiles are relevant to the support ticket. If the answer at 808 is YES, the method proceeds to 810. At 810, the method includes generating a list of recommended logfile types for the support ticket using a multi-label classification machine learning model trained with the dataset (e.g., the trained IRAR model 140 or the trained DRAR model 142 of FIG. 1).

At 812, the method includes outputting the list of recommended logfile types for the support ticket as the logfile recommendation. Optionally, the outputting can include displaying the list of recommended logfile types for the support ticket via a user interface at 814. For example, the list may be displayed in a pop-up window associated with the logfile recommender service as shown in FIG. 7, or in another manner.

Returning to 808, if the answer is NO indicating that no logfiles are predicted to be relevant to the support ticket, the method proceeds to 816. At 816, the method includes outputting an empty list of recommended logfile types for the support ticket as the logfile recommendation. Optionally, the outputting can include displaying the empty list of recommended logfile types via a user interface at 818. In other examples, different information may be displayed to communicate that no logfile types are predicted to be relevant to the support ticket (e.g., a message stating that no logfile types or logfiles are recommended for attachment to the support ticket).

In some examples, when the list of recommended logfile types is not empty, the logfile recommender service may also perform additional actions such as determining whether any logfiles of the recommended logfile types are already attached to the support ticket. Depending on the extent to which the logfile recommender service is integrated within the platform, the logfile recommender service may also fetch logfiles of the recommended type from storage of the platform (e.g., from database 114 of FIG. 1) and include the fetched logfiles as attachments to the list of recommended logfile types. In other examples, however, the list of recommended logfiles may simply provide the names of the recommended logfile types so that they can be attached to the support ticket (e.g., automatically attached to the support ticket by the platform or manually attached to the support ticket by a user of the platform).

Example 17—Example Method for Selecting Machine Learning Models for the Logfile Recommendations FIG. 9 is a flowchart of an example method 900 for selecting machine learning models for the logfile recommendation for a support ticket based on whether the support ticket includes a communication record. In particular, a model can be selected to generate the prediction of whether one or more logfiles are relevant to the support ticket from among a first binary classification machine learning model trained using a dataset that does not include communication records from past support tickets and a second binary classification machine learning model trained using a dataset that does include communication records from past support tickets. Similarly, a model can be selected to generate the list of recommended logfile types for the support ticket (if applicable) from among a first multi-label classification machine learning model trained using a dataset that does not include communication records from past support tickets and a second multi-label classification machine learning model trained using a dataset that does include communication records from past support tickets.

Method 900 can be performed, for example, by the system of FIGS. 1-2 and in conjunction with the other methods described herein. For example, method 900 may be performed at step 804 of FIG. 8. The method may be performed by a logfile recommender service such as logfile recommender service 130 of FIG. 1.

At 902, the method includes determining whether the support ticket includes a communication record. As described herein, the communication record can include a text transcript of communications regarding the problem which is the subject of the support ticket For examples, the communications may include communications from a user input to a communication record field of a support ticket interface such as communication record field 610 of FIG. 6, and responses to the user communications from a support developer or other personnel associated with the platform which are also displayed in the communication record field.

If the answer at 902 is NO, indicating that the support ticket does not include a communication record, the method proceeds to 904 and includes assigning an immediate response type to the support ticket. The method further includes, responsive to the support ticket being assigned the immediate response type, selecting the first binary classification machine learning model to generate the prediction at 906 and selecting the first multi-label classification machine learning model to generate the list of recommended logfile types for the support ticket at 908.

Otherwise, if the answer at 902 is YES, indicating that the support ticket does include a communication record, the method proceeds to 910 and includes assigning a detailed response type to the support ticket. The method further includes, responsive to the support ticket being assigned the detailed response type, selecting the second binary classification machine learning model to generate the prediction at 912 and selecting the second multi-label classification machine learning model to generate the list of recommended logfile types for the support ticket at 914.

Example 18—Example Method for Generating a List of Recommended Logfile Types FIG. 10 is a flowchart of an example method 1000 for generating a list of recommended logfile types for a support ticket using a multi-label classification model comprising a cumulative high-density logfile model and a cumulative low-density logfile model. As described herein, the cumulative high-density logfile model can include respective high-density logfile models for logfile types in a high-density subset (i.e., for logfile types which occur relatively frequently in the training dataset), whereas the cumulative low-density logfile model can include respective low-density logfile models for the logfile types in a low-density subset (i.e., for logfile types which occur relatively less frequently in the training dataset). In some examples, one or more of the high-density logfile models includes a supervised binary classification machine learning model, and/or one or more of the low-density logfile models includes an unsupervised cosine similarity machine learning model.

Method 1000 can be performed, for example, by the system of FIGS. 1-2 and in conjunction with the other methods described herein. For example, method 1000 may be performed at step 810 of FIG. 8 to generate the list of recommended logfile types for the support ticket. The method may be performed by a logfile recommender service such as logfile recommender service 130 of FIG. 1.

At 1002, the method includes using (e.g., calling and thereby deploying) the high-density logfile models to generate respective probability scores for the logfile types in the high-density subset.

At 1004, the method includes selecting, from among the logfile types in the high-density subset, one or more logfile types with respective probability scores above a probability score threshold for inclusion in the list of recommended logfile types for the support ticket.

At 1006, the method includes using the low-density logfile models to generate respective cosine similarity scores for the logfile types in the low-density subset.

At 1008, the method includes selecting, from among the logfile types in the low-density subset, one or more logfile types with respective cosine similarity scores above a cosine similarity score threshold for inclusion in the list of recommended logfile types for the support ticket.

As described herein, the resulting list of recommended logfile types can be output by the logfile recommender service. The outputting of the list can include displaying the list via a user interface. In some examples, the outputting of the list can include, or can prompt initiation of, additional actions by the logfile recommender service, the platform, or another entity. For example, the platform or another entity may fetch and attach logfiles of the recommended types to the support ticket.

Example 19—Example Architecture Overview

In any of the examples herein, the support tickets can be stored internally as data structures, tables, or the like in a computing system. In practice, each entity can be represented as a node, and relationships between nodes can be stored. Such nodes can take the form of logical objects that have properties and executable methods according to object-oriented programming paradigm. The data can be represented in data structures, database tables, or the like.

While the techniques described herein refer to support tickets in particular, similar techniques may be applied to other data objects. For example, the techniques described herein may also be applied to other data objects for which generation of relevant file or file type recommendations may be helpful.

Example 20—Example Implementations

Any of the following can be implemented.

Clause 1. A computer-implemented method comprising: receiving a request for a logfile recommendation for a support ticket, the request comprising data attributes of the support ticket; and responsive to the request: generating a prediction that one or more logfiles are relevant to the support ticket, wherein the prediction is generated by a binary classification machine learning model trained with a dataset comprising observed data attributes of past support tickets and observed data regarding logfile attachments of the past support tickets; responsive to the prediction that the one or more logfiles are relevant to the support ticket, generating a list of recommended logfile types for the support ticket, wherein the list of recommended logfile types for the support ticket is generated by a multi-label classification machine learning model trained with the dataset; and outputting the list of recommended logfile types for the support ticket as the logfile recommendation.

Clause 2. The method of Clause 1, wherein the data attributes of the support ticket comprise at least two of: a title of the support ticket; a problem description; or a communication record comprising a text transcript of communications.

Clause 3. The method of Clause 2, wherein: the binary classification machine learning model is selected from among a first binary classification machine learning model and a second binary classification machine learning model based on whether the data attributes of the support ticket comprise the communication record, the multi-label classification machine learning model is selected from among a first multi-label classification machine learning model and a second multi-label classification machine learning model based on whether the data attributes of the support ticket comprise the communication record, the dataset used to train the first binary classification machine learning model and the first multi-label classification machine learning model does not comprise communication records of the past support tickets, and the dataset used to train the second binary classification machine learning model and the second multi-label classification machine learning model comprises communication records of the past support tickets.

Clause 4. The method of Clause 3, further comprising: determining that the data attributes of the support ticket do not comprise the communication record; and responsive to the determination, selecting the first binary classification machine learning model to generate the prediction and selecting the first multi-label classification machine learning model to generate the list of recommended logfile types for the support ticket.

Clause 5. The method of Clause 3 or Clause 4, further comprising: determining that the data attributes of the support ticket comprise the communication record; and responsive to the determination, selecting the second binary classification machine learning model to generate the prediction and selecting the second multi-label classification machine learning model to generate the list of recommended logfile types for the support ticket.

Clause 6. The method of any one of Clauses 1-5, further comprising: before receiving the request: preparing the dataset for training of the multi-label classification machine learning model, wherein the preparing comprises: identifying a set of logfile types associated with the observed data regarding the logfile attachments of the past support tickets in the dataset; dividing the set of logfile types into a high-density subset and a low-density subset, wherein the high-density subset comprises logfile types that occur in the dataset at a frequency greater than a threshold frequency, and wherein the low-density subset comprises logfile types that occur in the dataset at a frequency less than the threshold frequency; and performing One-vs-Rest encoding of the logfile types in the high-density subset but not the logfile types in the low-density subset; and training the multi-label classification machine learning model with the prepared dataset.

Clause 7. The method of Clause 6, wherein: the multi-label classification machine learning model comprises a cumulative high-density logfile model and a cumulative low-density logfile model; the cumulative high-density logfile model comprises respective high-density logfile models for the logfile types in the high-density subset; and the cumulative low-density logfile model comprises respective low-density logfile models for the logfile types in the low-density subset.

Clause 8. The method of Clause 7, wherein: one or more of the high-density logfile models comprises a supervised binary classification machine learning model; and one or more of the low-density logfile models comprises an unsupervised cosine similarity machine learning model.

Clause 9. The method of Clause 7 or Clause 8, wherein the generating the list of recommended logfile types for the support ticket using the multi-label classification machine learning model comprises: using the high-density logfile models to generate respective probability scores for the logfile types in the high-density subset; selecting, from among the logfile types in the high-density subset, one or more logfile types with respective probability scores above a probability score threshold for inclusion in the list of recommended logfile types for the support ticket; using the low-density logfile models to generate respective cosine similarity scores for the logfile types in the low-density subset; and selecting, from among the logfile types in the low-density subset, one or more logfile types with respective cosine similarity scores above a cosine similarity score threshold for inclusion in the list of recommended logfile types for the support ticket.

Clause 10. The method of any one of Clauses 1-9, wherein: the request for the logfile recommendation for the support ticket is received via a user interface; and outputting the list of recommended logfile types for the support ticket comprises displaying the list of recommended logfile types for the support ticket via the user interface.

Clause 11. The method of Clause 10, wherein: outputting the list of recommended logfile types for the support ticket further comprises displaying an indication of whether one or more logfiles of the recommended logfile types are attached to the support ticket.

Clause 12. A computing system comprising: at least one hardware processor; at least one memory coupled to the at least one hardware processor; a binary classification machine learning model trained with a dataset comprising observed data attributes of past support tickets and observed data regarding logfile attachments of the past support tickets; a multi-label classification machine learning model trained with the dataset; and one or more non-transitory computer-readable media having stored therein computer-executable instructions that, when executed by the computing system, cause the computing system to perform: receiving, via a user interface, an input comprising data attributes of a support ticket; responsive to receiving the input, sending a request for a logfile recommendation for a support ticket to a logfile recommender service, the request comprising the data attributes of the support ticket; responsive to sending the request, receiving the logfile recommendation for the support ticket from the logfile recommender service, wherein the logfile recommender service determines the logfile recommendation for the support ticket by generating a prediction using the binary classification machine learning model based on the data attributes of the support ticket and a by generating a list of recommended logfile types for the support ticket using the multi-label classification machine learning model based on the data attributes of the support ticket, wherein the prediction indicates that one or more logfiles are relevant to the support ticket; and responsive to receiving the logfile recommendation for the support ticket, displaying the list of the recommended logfile types for the support ticket via the user interface.

Clause 13. The system of Clause 12, wherein the support ticket is a first support ticket, and wherein the computer-executable instructions further comprise computer-executable instructions that, when executed by the computing system, cause the computing system to perform: receiving, via the user interface, an input comprising data attributes of a second support ticket; responsive to receiving the input comprising the data attributes of the second support ticket, sending a request for a logfile recommendation for the second support ticket, the request for the logfile recommendation for the second support ticket comprising a title of the second support ticket and a problem description of the second support ticket; responsive to sending the request for the logfile recommendation for the second support ticket, receiving the logfile recommendation for the second support ticket from the logfile recommender service, wherein the logfile recommendation for the second support ticket comprises an indication that no logfiles are relevant to the second support ticket, wherein the indication that no logfiles are relevant to the second support ticket is determined by the logfile recommender service based on a prediction generated by the binary classification machine learning model based on the data attributes of the second support ticket, and wherein the multi-label classification machine learning model is not called in response to the request for the logfile recommendation for the second support ticket; and responsive to receiving the indication that no logfiles are relevant to the second support ticket, displaying the indication that no logfiles are relevant to the second support ticket via the user interface.

Clause 14. The system of Clause 12 or Clause 13, wherein: the multi-label classification machine learning model comprises a plurality of supervised binary classification machine learning models and a plurality of unsupervised cosine similarity machine learning models that execute similarity-based algorithms.

Clause 15. The system of any one of Clauses 12-14, wherein: the data attributes of the support ticket comprise a title and a problem description; the support ticket does not comprise a communication record; the observed data attributes of past support tickets in the dataset comprise respective observed titles and observed problem descriptions; and the observed data attributes of the past support tickets in the dataset do not comprise communication records.

Clause 16. The system of any one of Clauses 12-15, wherein: the data attributes of the support ticket comprises a title, a problem description, and a communication record; and the observed data attributes of the past support tickets in the dataset comprise respective observed titles, problem descriptions, and communication records.

Clause 17. The system of Clause 16, wherein the communication record comprises at least one of: a transcript of a phone call regarding a problem; a transcript of an online chat session regarding the problem; or a transcript of online messages regarding the problem.

Clause 18. One or more non-transitory computer-readable media comprising computer-executable instructions that, when executed by a computing system, cause the computing system to perform operations comprising: training a binary classification machine learning model with a dataset comprising observed data attributes of past support tickets and observed data regarding logfile attachments of the past support tickets; training a multi-label classification machine learning model with the dataset; receiving a request for a logfile recommendation for a support ticket, the request comprising data attributes of the support ticket; and responsive to the request: generating a prediction that one or more logfiles are relevant to the support ticket, wherein the prediction is generated by the binary classification machine learning model based on the data attributes of the support ticket; responsive to the prediction that the one or more logfiles are relevant to the support ticket, generating a list of recommended logfile types for the support ticket, wherein the list of recommended logfile types for the support ticket is generated by the multi-label classification machine learning model based on the data attributes of the support ticket; and outputting the list of recommended logfile types for the support ticket as the logfile recommendation for the support ticket.

Clause 19. The computer-readable media of Clause 18, wherein: the binary classification machine learning model is a first binary classification machine learning model; the multi-label classification machine learning model is a first multi-label classification machine learning model; the support ticket is a first support ticket, and the data attributes of the first support ticket do not comprise a communication record; and the operations further comprise: receiving a request for a logfile recommendation for a second support ticket, the request for the logfile recommendation for the second support ticket comprising data attributes of the second support ticket, wherein the data attributes of the second support ticket comprise a communication record; responsive to the request for the logfile recommendation for the second support ticket, generating a prediction that one or more logfiles are relevant to the second support ticket, wherein the prediction that the one or more logfiles are relevant to the second support ticket is generated by the second binary classification machine learning model based on the data attributes of the second support ticket; responsive to the prediction that the one or more logfiles are relevant to the second support ticket, generating a list of recommended logfile types for the second support ticket, wherein the list of recommended logfile types for the second support ticket is generated by the second multi-label classification machine learning model based on the data attributes of the second support ticket; and outputting the list of recommended logfile types for the second support ticket as the logfile recommendation for the second support ticket.

Clause 20. The computer-readable media of Clause 18 or Clause 19, wherein: vectorization of the observed data attributes of the past support tickets is performed prior to the training of the binary classification machine learning model and the multi-label classification machine learning model.

Example 21—Example Advantages

A number of advantages can be achieved via the technologies described herein. For example, the techniques described herein can reduce the need for support developers or users to manually identify logfile types or individual logfiles which are relevant to a given support ticket, thus allowing them to focus on more complex tasks such as analyzing pertinent logfiles.

As another example, in the techniques described herein, the attachment prediction model (e.g., the first or second binary classification machine learning model) is called first to interact with input data from a support ticket. The attachment prediction model decides whether to call the attachment recommendation model (e.g., the first or second multi-label classification machine learning model) based on the output predicted (e.g., based on whether the output indicates that there are logfiles relevant to the support ticket). Thus, the attachment prediction model acts as a gateway to reduce traffic for the attachment recommendation model by diverting support tickets which do not require logfiles, such that the attachment recommendation model can focus on accurately predicting the recommended logfile types for the support ticket. Accordingly, the techniques described herein can reduce the processing burden on the computing system components that implement the attachment recommendation machine learning models by reducing unnecessary processing by the models and thereby improve their performance.

As yet another example, by selecting which versions of the attachment prediction and attachment recommendation machine learning models to use depending on a desired response type, the techniques described herein allow users to tailor the response of the logfile recommender service based on their needs on a case-by-case basis (i.e., individually for each support ticket). If the user desires a relatively fast response for a given support ticket, the logfile recommender service calls the models trained to analyze the support ticket data without communication records. In contrast, if a user desires a relatively slow but possibly more accurate response for a given support ticket, the logfile recommender service calls the models trained to analyze support ticket data with communication records.

Example 22—Example Computing Systems

Figure 11:
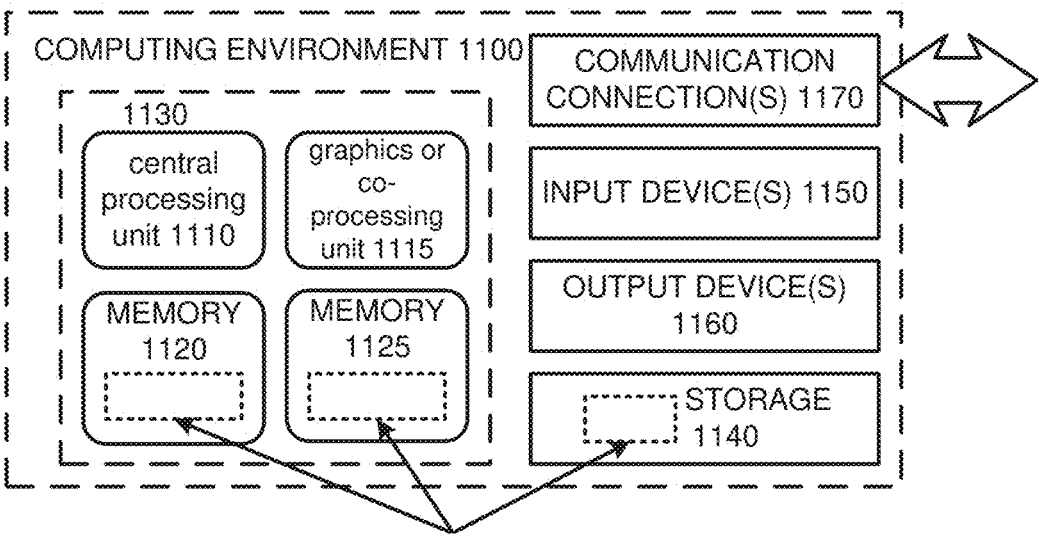
FIG. 11 is a block diagram of an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 can have additional features. For example, the computing system 1100 includes storage 1140, one or more input devices 1150, one or more output devices 1160, and one or more communication connections 1170, including input devices, output devices, and communication connections for interacting with a user. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 23—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 24—Example Cloud Computing Environment

Figure 12:
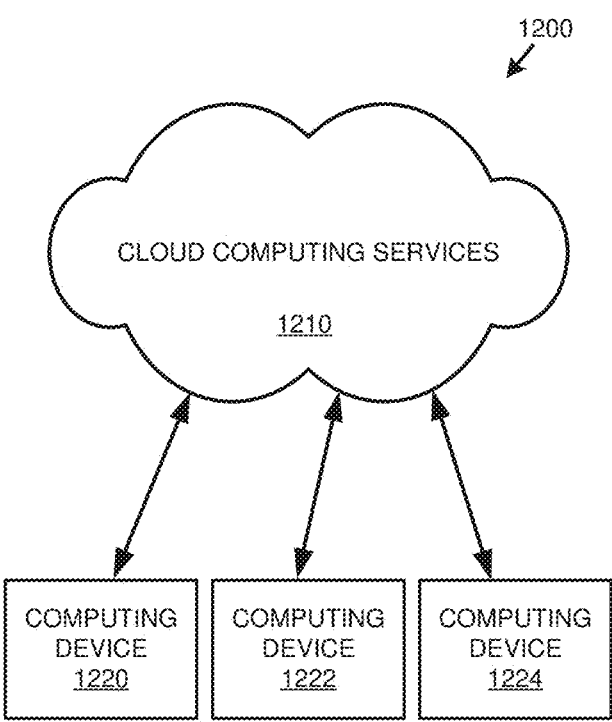
FIG. 12 is a block diagram of an example cloud computing environment that can be used in conjunction with the technologies described herein.

FIG. 12 depicts an example cloud computing environment 1200 in which the described technologies can be implemented, including, e.g., the system 100 of FIG. 1 and other systems herein. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example 25—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 26—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
   receiving, by a logfile recommender server, a request for a logfile recommendation for a support ticket via a user interface, the request comprising data attributes of the support ticket; and
   responsive to the request, by the logfile recommender server:
      generating a prediction that one or more logfiles are relevant to the support ticket, wherein the prediction is generated by a binary classification machine learning model trained with a dataset comprising observed data attributes of past support tickets and observed data regarding logfile attachments of the past support tickets, wherein the logfile recommender server determines, based on the prediction, whether to call a multi-label classification machine learning model trained with the dataset;
      responsive to the prediction that the one or more logfiles are relevant to the support ticket, calling the multi-label classification machine learning model, wherein the multi-label classification machine learning model generates a list of recommended logfile types for the support ticket; and
      displaying the list of recommended logfile types for the support ticket as the logfile recommendation via the user interface.

2. The method of claim 1, wherein the data attributes of the support ticket comprise at least two of:
   a title of the support ticket;
   a problem description; or
   a communication record comprising a text transcript of communications.

3. The method of claim 2, wherein:
   the binary classification machine learning model is selected from among a first binary classification machine learning model and a second binary classification machine learning model based on whether the data attributes of the support ticket comprise the communication record,
   the multi-label classification machine learning model is selected from among a first multi-label classification machine learning model and a second multi-label classification machine learning model based on whether the data attributes of the support ticket comprise the communication record,
   the dataset used to train the first binary classification machine learning model and the first multi-label classification machine learning model does not comprise communication records of the past support tickets, and the dataset used to train the second binary classification machine learning model and the second multi-label classification machine learning model comprises communication records of the past support tickets.

4. The method of claim 3, further comprising, by the logfile recommender server:

determining that the data attributes of the support ticket do not comprise the communication record; and responsive to the determination, selecting the first binary classification machine learning model to generate the prediction and selecting the first multi-label classification machine learning model to generate the list of recommended logfile types for the support ticket.

5. The method of claim 3, further comprising, by the logfile recommender server:

determining that the data attributes of the support ticket comprise the communication record; and responsive to the determination, selecting the second binary classification machine learning model to generate the prediction and selecting the second multi-label classification machine learning model to generate the list of recommended logfile types for the support ticket.

6. The method of claim 1, further comprising, before receiving the request:

preparing the dataset for training of the multi-label classification machine learning model, wherein the preparing comprises:

identifying a set of logfile types associated with the observed data regarding the logfile attachments of the past support tickets in the dataset;

dividing the set of logfile types into a high-density subset and a low-density subset, wherein the high-density subset comprises logfile types that occur in the dataset at a frequency greater than a threshold frequency, and wherein the low-density subset comprises logfile types that occur in the dataset at a frequency less than the threshold frequency; and performing One-vs-Rest encoding of the logfile types in the high-density subset but not the logfile types in the low-density subset; and training the multi-label classification machine learning model with the prepared dataset.

7. The method of claim 6, wherein:

the multi-label classification machine learning model comprises a cumulative high-density logfile model and a cumulative low-density logfile model;

the cumulative high-density logfile model comprises respective high-density logfile models for the logfile types in the high-density subset; and the cumulative low-density logfile model comprises respective low-density logfile models for the logfile types in the low-density subset.

8. The method of claim 7, wherein:

one or more of the high-density logfile models comprises a supervised binary classification machine learning model; and one or more of the low-density logfile models comprises an unsupervised cosine similarity machine learning model.

9. The method of claim 7, wherein the generating the list of recommended logfile types for the support ticket using the multi-label classification machine learning model comprises:

using the high-density logfile models to generate respective probability scores for the logfile types in the high-density subset;

selecting, from among the logfile types in the high-density subset, one or more logfile types with respective probability scores above a probability score threshold for inclusion in the list of recommended logfile types for the support ticket;

using the low-density logfile models to generate respective cosine similarity scores for the logfile types in the low-density subset; and selecting, from among the logfile types in the low-density subset, one or more logfile types with respective cosine similarity scores above a cosine similarity score threshold for inclusion in the list of recommended logfile types for the support ticket.

10. The method of claim 1, wherein:

displaying the list of recommended logfile types for the support ticket further comprises displaying an indication of whether one or more logfiles of the recommended logfile types are attached to the support ticket.

11. A computing system comprising:

at least one hardware processor;

at least one memory coupled to the at least one hardware processor;

a logfile recommender service comprising a logfile recommender server;

a binary classification machine learning model trained with a dataset comprising observed data attributes of past support tickets and observed data regarding logfile attachments of the past support tickets;

a multi-label classification machine learning model trained with the dataset; and one or more non-transitory computer-readable media having stored therein computer-executable instructions that, when executed by the computing system, cause the computing system to perform:

receiving, via a user interface, an input comprising data attributes of a support ticket;

responsive to receiving the input, sending a request for a logfile recommendation for a support ticket to the logfile recommender server, the request comprising the data attributes of the support ticket;

responsive to sending the request, receiving the logfile recommendation for the support ticket from the logfile recommender server, wherein the logfile recommender server determines the logfile recommendation for the support ticket by generating a prediction using the binary classification machine learning model based on the data attributes of the support ticket and, based on the prediction, calling the multi-label classification machine learning model to generate a list of recommended logfile types for the support ticket based on the data attributes of the support ticket, wherein the prediction indicates that one or more logfiles are relevant to the support ticket; and responsive to receiving the logfile recommendation for the support ticket, displaying the list of the recommended logfile types for the support ticket via the user interface.

12. The system of claim 11, wherein the support ticket is a first support ticket, and wherein the computer-executable instructions further comprise computer-executable instructions that, when executed by the computing system, cause the computing system to perform:

receiving, via the user interface, an input comprising data attributes of a second support ticket;

responsive to receiving the input comprising the data attributes of the second support ticket, sending a request for a logfile recommendation for the second support ticket to the logfile recommender server, the request for the logfile recommendation for the second support ticket comprising a title of the second support ticket and a problem description of the second support ticket;

responsive to sending the request for the logfile recommendation for the second support ticket, receiving the logfile recommendation for the second support ticket from the logfile recommender server, wherein the logfile recommendation for the second support ticket comprises an indication that no logfiles are relevant to the second support ticket, wherein the indication that no logfiles are relevant to the second support ticket is determined by the logfile recommender server based on a prediction generated by the binary classification machine learning model based on the data attributes of the second support ticket, and wherein the multi-label classification machine learning model is not called in response to the request for the logfile recommendation for the second support ticket; and responsive to receiving the indication that no logfiles are relevant to the second support ticket, displaying the indication that no logfiles are relevant to the second support ticket via the user interface.

13. The system of claim 11, wherein:

the multi-label classification machine learning model comprises a plurality of supervised binary classification machine learning models and a plurality of unsupervised cosine similarity machine learning models that execute similarity-based algorithms.

14. The system of claim 11, wherein:

the data attributes of the support ticket comprise a title and a problem description;

the support ticket does not comprise a communication record;

the observed data attributes of the past support tickets in the dataset comprise respective observed titles and observed problem descriptions; and the observed data attributes of the past support tickets in the dataset do not comprise communication records.

15. The system of claim 11, wherein:

the data attributes of the support ticket comprises a title, a problem description, and a communication record; and the observed data attributes of the past support tickets in the dataset comprise respective observed titles, problem descriptions, and communication records.

16. The system of claim 15, wherein the communication record comprises at least one of:

a transcript of a phone call regarding a problem;

a transcript of an online chat session regarding the problem; or a transcript of online messages regarding the problem.

17. One or more non-transitory computer-readable media comprising computer-executable instructions that, when executed by a computing system, cause the computing system to perform operations comprising:

training a binary classification machine learning model with a dataset comprising observed data attributes of past support tickets and observed data regarding logfile attachments of the past support tickets;

training a multi-label classification machine learning model with the dataset;

receiving, by a logfile recommender server, a request for a logfile recommendation for a support ticket via a user interface, the request comprising data attributes of the support ticket; and responsive to the request, by the logfile recommender server:

generating a prediction that one or more logfiles are relevant to the support ticket, wherein the prediction is generated by the binary classification machine learning model based on the data attributes of the support ticket, wherein the logfile recommender server determines, based on the prediction, whether to call the multi-label classification machine learning model;

responsive to the prediction that the one or more logfiles are relevant to the support ticket, calling the multi-label classification machine learning model, wherein the multi-label classification machine learning model generates a list of recommended logfile types for the support ticket based on the data attributes of the support ticket; and displaying the list of recommended logfile types for the support ticket as the logfile recommendation for the support ticket via the user interface.

18. The computer-readable media of claim 17, wherein:

the binary classification machine learning model is a first binary classification machine learning model;

the multi-label classification machine learning model is a first multi-label classification machine learning model;

the support ticket is a first support ticket, and the data attributes of the first support ticket do not comprise a communication record; and the operations further comprise:

receiving, by the logfile recommender server, a request for a logfile recommendation for a second support ticket via the user interface, the request for the logfile recommendation for the second support ticket comprising data attributes of the second support ticket, wherein the data attributes of the second support ticket comprise a communication record;

responsive to the request for the logfile recommendation for the second support ticket, by the logfile recommender server, generating a prediction that one or more logfiles are relevant to the second support ticket, wherein the prediction that the one or more logfiles are relevant to the second support ticket is generated by a second binary classification machine learning model based on the data attributes of the second support ticket, wherein the logfile recommender server determines, based on the prediction, whether to call a second multi-label classification machine learning model;

responsive to the prediction that the one or more logfiles are relevant to the second support ticket, calling the second multi-label classification machine learning model, wherein the second multi-label classification machine learning model generates a list of recommended logfile types for the second support ticket based on the data attributes of the second support ticket; and displaying the list of recommended logfile types for the second support ticket as the logfile recommendation for the second support ticket via the user interface.

19. The computer-readable media of claim 17, wherein:

vectorization of the observed data attributes of the past support tickets is performed prior to the training of the binary classification machine learning model and the multi-label classification machine learning model.

* * * * *